(12) United States Patent
Maekawa

(10) Patent No.: US 8,064,310 B2
(45) Date of Patent: Nov. 22, 2011

(54) OPTICAL DISK RECORDING DEVICE WHICH DETECTS PRE-PIT DISTRIBUTION AND SHIFTS RECORDING POSITION ACCORDINGLY

(75) Inventor: Tomoyuki Maekawa, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 560 days.

(21) Appl. No.: 11/763,857

(22) Filed: Jun. 15, 2007

(65) Prior Publication Data

US 2007/0297298 A1 Dec. 27, 2007

(30) Foreign Application Priority Data

Jun. 23, 2006 (JP) ................................. 2006-174087

(51) Int. Cl.
*G11B 7/0045* (2006.01)
(52) U.S. Cl. .................... 369/59.19; 369/59.2
(58) Field of Classification Search ........................ None
See application file for complete search history.

(56) References Cited

U.S. PATENT DOCUMENTS

| | | | |
|---|---|---|---|
| 6,693,862 B1 * | 2/2004 | Shigemori | 369/47.31 |
| 7,012,865 B2 | 3/2006 | Deguchi et al. | |
| 7,075,862 B2 | 7/2006 | Adachi | |
| 2002/0101803 A1 * | 8/2002 | Hayashi et al. | 369/47.3 |
| 2002/0167880 A1 * | 11/2002 | Ando et al. | 369/59.25 |
| 2004/0052174 A1 | 3/2004 | Hayashi et al. | |
| 2006/0133248 A1 * | 6/2006 | Ueda et al. | 369/53.15 |

FOREIGN PATENT DOCUMENTS

| | | |
|---|---|---|
| JP | 9-326138 | 12/1997 |
| JP | 2001-357620 | 12/2001 |

* cited by examiner

*Primary Examiner* — Peter Vincent Agustin
*Assistant Examiner* — Emily Frank
(74) *Attorney, Agent, or Firm* — Oblon, Spivak, McClelland, Maier & Neustadt, L.L.P.

(57) ABSTRACT

An optical disk recording device that detects a shift of the recording position with respect to an optical disk, has a pre-pit distribution detecting circuit that detects the distribution of pre-pits for a plurality of wobbles based on binarized pre-pit signals obtained by binarizing pre-pit signals corresponding to pre-pits on said optical disk and a wobble counter value obtained by counting said binarized pre-pit signals in synchronization with a locked wobble, which is a wobble signal having a period corresponding to a wobble on said optical disk and fixed in phase; and a wobble slip determining circuit that compares the distribution of said pre-pits detected by said pre-pit distribution detecting circuit and a reference pre-pit distribution corresponding to a desired recording position, thereby determining the shift amount of the recording position with respect to said desired recording position for each wobble.

12 Claims, 26 Drawing Sheets

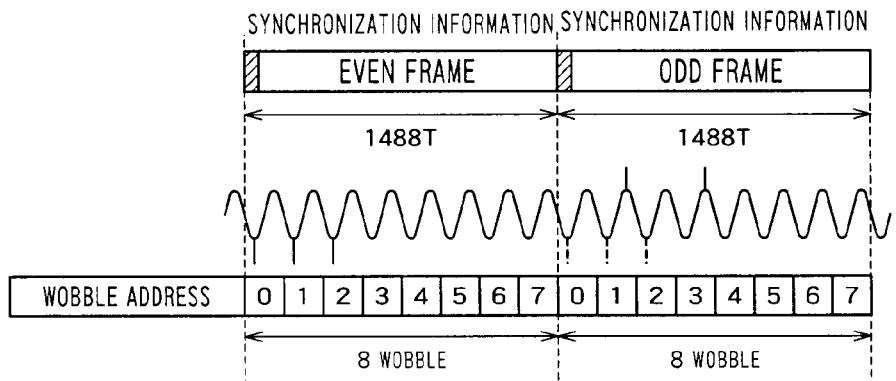
FIG. 2A
PRESENCE OR ABSENCE OF PRE-PIT IN 8 WOBBLE(1:PRESENCE, 0:ABSENCE)
| WOBBLE ADDRESS | 0 | 1 | 2 | 3 | 4 | 5 | 6 | 7 |
|---|---|---|---|---|---|---|---|---|
| EVEN SYNC | 1 | 1 | 1 | 0 | 0 | 0 | 0 | 0 |
| ODD SINC | 1 | 1 | 0 | 0 | 0 | 0 | 0 | 0 |
| BIT 0 | 1 | 0 | 0 | 0 | 0 | 0 | 0 | 0 |
| BIT 1 | 1 | 0 | 1 | 0 | 0 | 0 | 0 | 0 |
FIG. 2B
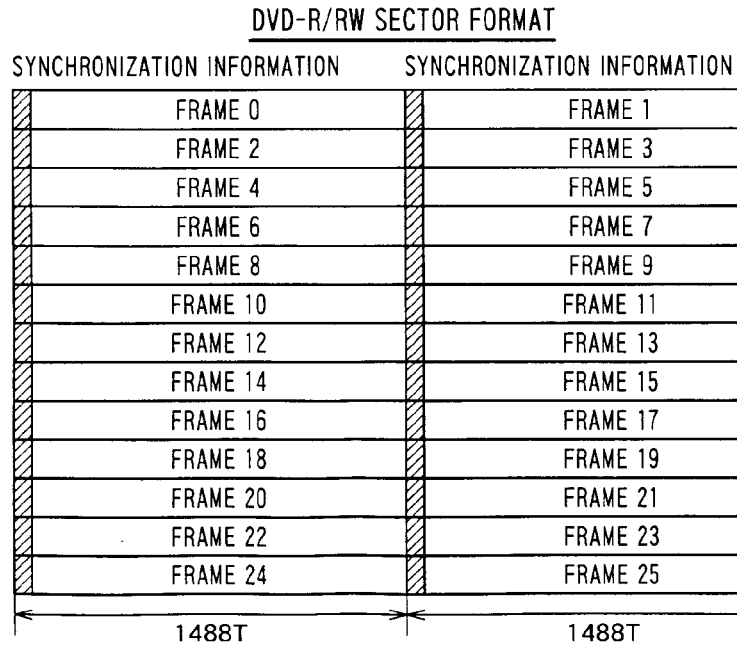
FIG. 2C

OPTICAL DISK RECORDING DEVICE WHICH DETECTS PRE-PIT DISTRIBUTION AND SHIFTS RECORDING POSITION ACCORDINGLY

CROSS-REFERENCE TO RELATED APPLICATION

This application is based upon and claims the benefit of priority from the prior Japanese Patent Application No. 2006-174087, filed on Jun. 23, 2006, the entire contents of which are incorporated herein by reference.

BACKGROUND OF THE INVENTION

1. Field of the Invention

The present invention relates to a recordable optical disk recording device. In particular, it relates to detection of a recording position shift, control of a recording operation, and control of a recording position during recording of information onto an optical disk having pre-pits, such as DVD-R/RW.

2. Background Art

Recently, various kinds of rewritable optical disk media, such as CD-R/RW, DVD-RAM, DVD-R/RW and DVD+R/RW, have appeared on the market.

Such optical disks already contain address information used as positional information for data recording, and user data is recorded on the disks using the address information.

For example, as for the DVD-R/RW, conventionally, there have been proposed an optical disk that has information recording tracks in guide grooves wobbling at a predetermined period and pre-pits formed at predetermined intervals on regions (lands) between the grooves, and a recording device that controls the rotation of the optical disk based on wobble signals detected from the grooves and controls the recording position based on pre-pit signals detected from the pre-pits (see Japanese Patent Laid-Open Publication No. 9-326138, for example).

The pre-pit is referred to also as land pre-pit because the pre-pit is formed on the land.

According to this conventional technique, even if the track pitch is narrow, accurate address information and disk rotation control information can be obtained.

Unlike DVD-RAM, according to this conventional technique, address information is not placed in the form of pits at the leading edges of sectors in the information recording track (in other words, no address pit exists in the groove forming the recording track). Therefore, high-density recording is possible, discontinuity of the recording information because of the address information is avoided, and the compatibility with read-only disks is high.

When recording user data on a DVD-R/RW, new data may be recorded following previously recorded data (incremental writing). In this case, according to the related standard, the precision of placement of the recorded data should fall within ±1 byte. If the precision is not achieved, the previously recorded data is overwritten and becomes unable to be read, and the reproduction stability is degraded because of the gap between the previously recorded data and the newly recorded data.

Thus, the user data to be recorded on the DVD-R/RW has to be always kept in an appropriate positional relationship with pre-pits. Therefore, means of detecting a recording position shift during recording or a process of stopping the recording or recovering the recording position to the original position based on the detection result is quite important.

In addition, there has been disclosed a technique of generating recording clock signals from a reproduced wobble signals so that variations of disk rotation can be followed when recording modulated data on an optical disk, such as DVD-R/RW (see Japanese Patent Laid-Open Publication No. 2001-357620, for example).

However, such an optical disk has a narrowed track pitch in order to perform high-density recording. As a result, a leakage from grooves adjacent to a track irradiated with a light beam, or a so-called crosstalk, cannot be ignored. If a crosstalk from an inner or outer adjacent groove occurs, the wobble signal interferes with the wobble signal component from the adjacent track, and the amplitude and phase thereof varies. In the case where the wobble signal is used for controlling the recording position, particularly if a phase of the wobble signal varies, the recording position cannot be controlled with a sufficient precision.

As for CD-R/RW or the like, conventionally, there has been used a method of recording data on the disk using clock signals of a fixed frequency generated by a quartz oscillator or the like. However, this method is not suitable for high-density disks, such as DVD-R/RW, because variations of disk rotation cannot be followed.

To the contrary, pre-pits are arranged so that the pre-pits do not interfere with each other, and therefore, the positions of the pre-pits on the optical disk can be accurately detected from the pre-pit signals detected from the pre-pits, and the recording position can be precisely controlled.

However, the format of pre-pits is complicated because of the relationship between EVEN frames and ODD frames, the presence of four kinds of bit patterns, and the like as described above. Furthermore, during recording, the pre-pit signals themselves may be unable to be stably reproduced because of high noise level. Therefore, it is quite difficult to generate a stable recording clock according to the condition of detection of the pre-pits.

There has been proposed a recording position controlling method using pre-pits (see Japanese Patent Laid-Open Publication No. 2004-95081, for example).

According to this conventional technique, in order that variations of disk rotation can be followed to some extent, a recording clock is generated based on wobbles, and recording is performed according to the recording clock. And in order to compensate for variations of wobble phase described above, the difference in phase between the address information generated by the modulating circuit and the pre-pit detection information is detected during recording, and the phase difference information is fed back to the recording clock. In this way, the correct recording position is stably maintained.

The phase difference detection according to the conventional technique described above is performed in the following two methods, for example.

A first method involves detecting the phase difference with a channel bit precision from the relationship between the modulated address information and the detected pre-pit position within one wobble and controlling the recording position to converge.

In this first method, a wobble signal may be missed due to a scratch or the like during recording, and the locked wobble output from the wobble PLL may slip in the lag or advance direction.

Typically, for example, in order to avoid the effect of such a scratch, the presence of the scratch is detected based on the envelope detection of wobble signals, and the PLL is held for the missed wobble signal based on the scratch detection result.

However, the capability of holding the PLL is limited to some extent, and particularly in the case of DVD-R/RW, the wobble is modulated in phase as described above. Therefore, the phase at the start of holding itself may be shifted from the center thereof, and a wobble slip is likely to result.

As described above, the recording clock is basically generated form the locked wobble, and therefore, if a wobble slip occurs, the recording position is shifted by one wobble.

According to the first method, if a recording position shift occurs due to such a wobble slip, the recording position control is performed with respect to the pre-pit at the position shifted by one wobble. Thus, the one-wobble-shifted state is maintained.

On the other hand, a second method involves detecting the phase difference between the sector SYNC position indicated by the modulated address information and the sector SYNC position detected by the pre-pit decoder with a byte precision in order to address the recording position shift exceeding ½ wobble that occurs when a wobble slip occurs, which is a problem with the first method.

According to this method, since the phase difference is detected based on the modulated address, the address for the pre-pit decoder, and the counter value for each sector, the effective control range is expanded to ±½ sector.

As a result, if a wobble slip described above occurs, the amount of the shift caused thereby is detected, so that the recording position control is performed, and the recording position is gradually recovered to the correct position during recording. In this example, the phase difference exceeding ±1 frame is clipped to prevent increase of the amount of information.

However, according to the second method, the address counter for pre-pit decoding has to operate normally. Thus, it is a prerequisite that the pre-pits can be precisely read during recording.

In order to achieve the prerequisite, synchronization conditions of synchronizing counters have to be stably assured. For example, as for sector synchronization, the SYNC patterns have to be continuously obtained.

In addition, the reliability of pre-pit decoding has to be high. Pre-pit data, which is composed of 8 bits for each sector (excluding the relative address), is added with a predetermined error correcting parity. Parity calculation is performed based on the obtained data, and if the calculation result is correct, it can be determined that the phase relationship among the synchronizing counters is correct.

However, during recording, the power of the laser light source varies according to whether to form a recording mark or not (that is, to form a space), so that the pre-pit signal amplitude also varies according to whether the laser forms a mark or a space. Furthermore, since the pre-pit signal is at a high frequency, it is difficult to distinguish the pre-pit signal from noise when the laser forms a space, and the pre-pit signal amplitude is low.

Therefore, it is difficult and impractical to stably and accurately detects a pre-pit.

SUMMARY OF THE INVENTION

According one aspect of the present invention, there is provided: an optical disk recording device that detects a shift of the recording position with respect to an optical disk, comprising a pre-pit distribution detecting circuit that detects the distribution of pre-pits for a plurality of wobbles based on binarized pre-pit signals obtained by binarizing pre-pit signals corresponding to pre-pits on said optical disk and a wobble counter value obtained by counting said binarized pre-pit signals in synchronization with a locked wobble, which is a wobble signal having a period corresponding to a wobble on said optical disk and fixed in phase; and a wobble slip determining circuit that compares the distribution of said pre-pits detected by said pre-pit distribution detecting circuit and a reference pre-pit distribution corresponding to a desired recording position, thereby determining the shift amount of the recording position with respect to said desired recording position for each wobble.

BRIEF DESCRIPTION OF THE DRAWINGS

FIG. 2A is a diagram showing a relationship among wobble addresses, an EVEN frame and an ODD frame;

FIG. 2B is a diagram showing presence or absence of a pre-pit in eight wobbles;

FIG. 2C is a diagram showing a DVD-R/RW sector format;

FIG. 15 shows a waveform of the locked wobble and wobble counter values ("WBA[2:0]") in a case where the wobble signal is not normally reproduced due to a scratch or the like;

FIG. 19C is an enlarged diagram of parts of FIG. 19A.

FIG. 20B is an enlarged diagram of parts of FIG. 20A.

DETAILED DESCRIPTION

An optical disk recording device according to the present invention monitors the distribution of pre-pits within a wobble every a predetermined number of wobbles during recording of a DVD-R/RW, for example. Thus, even in a situation where the probability of detection of pre-pits is relatively low, a recording position shift with respect to the optical disk due to a scratch or the like can be detected for each wobble.

Furthermore, if the optical disk recording device described above detects a recording position shift, the optical disk recording device adjusts a recording clock to stop recording or recovering the recording position to the correct position without stopping recording. Thus, overwriting of recorded data or a gap in the recording area can be prevented from occurring during incremental writing, and the data reliability can be ensured.

In the following, an embodiment of the present invention will be described with reference to the drawings.

Embodiment

Figure 1:
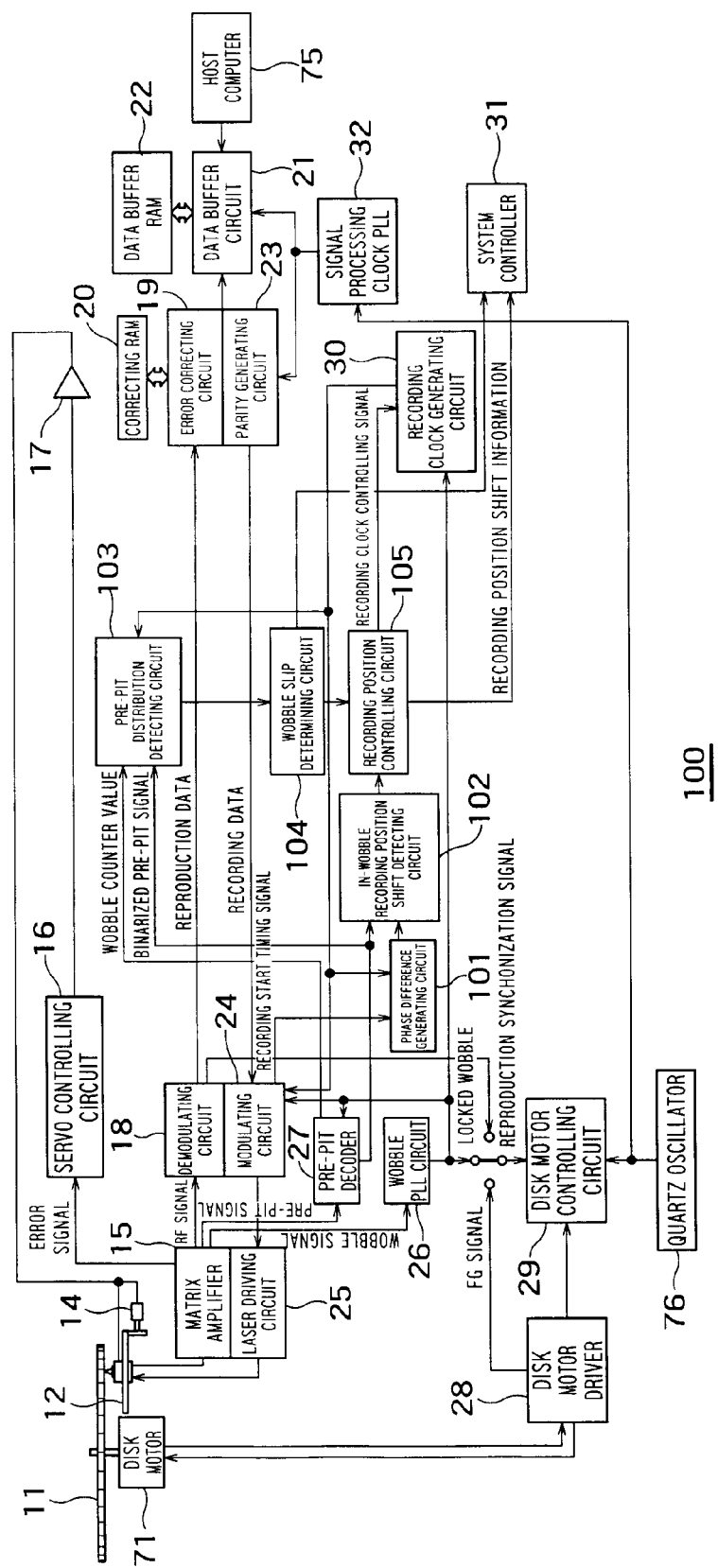
FIG. 1 is a diagram showing a configuration of essential parts of an optical disk recording device according to an embodiment of an aspect of the present invention.

FIG. 1 is a diagram showing a configuration of essential parts of an optical disk recording device 100 according to an embodiment of an aspect of the present invention.

As shown in FIG. 1, the optical disk recording device 100 has an optical disk 11, a pick-up 12 that emits laser light to the optical disk 11 and reads the reflection light, a matrix amplifier 15 that calculates and generates a pre-pit signal, a wobble signal and a servo error signal from a reproduction signal from the pick-up 12, and a servo controlling circuit 16 that controls operations, such as focusing and tracking, of the pick-up 12 based on the error signal.

The optical disk recording device 100 further has a disk motor 71 that drives the optical disk 11, a laser driving circuit 25 that drives a laser of the pick-up 12 based on a recording signal, and a disk motor controlling circuit 29 that controls the rotation of the disk motor 71.

A quadrant photodetector in the pick-up 12 is divided into four, A, B, C and D faces.

For recording, recording information output from a host computer 75 is input to a modulating circuit 24 through a data buffer RAM 22, a data buffer circuit 21, a correcting RAM 20, and a parity generating circuit 23.

The modulating circuit 24 modulates the recording data based on a recording clock according to a recording format, which will be described below, and outputs the modulated recording data.

Now, an exemplary positional relationship between pre-pits and wobbles (a recording format) will be described.

FIG. 2A is a diagram showing a relationship among wobble addresses, an EVEN frame and an ODD frame. FIG. 2B is a diagram showing presence or absence of a pre-pit in eight wobbles. FIG. 2C is a diagram showing a DVD-R/RW sector format.

Wobbles are formed to have a period equivalent to 186 channel bits, and a pre-pit is formed at a position corresponding to the top of a wobble and has a length equivalent to several channel bits (FIG. 2A). In the DVD-R/RW format, one SYNC frame is composed of 1488 channel bits or 8 wobbles. The pre-pit can exist in the first three wobbles of the eight wobbles (FIG. 2B).

Now, with reference to FIG. 2C, a DVD-R/RW sector format will be described. One sector is composed of 26 frames. Pre-pits exist in every two frames and typically exist only in EVEN frames. However, in order to avoid interference with an adjacent track, pre-pits may exist in ODD frames so that pre-pits on the inner side and pre-pits on the outer side don't overlap.

Typically, a sector synchronization pattern for pre-pits exists in a frame 0, which is an EVEN frame (EVEN SYNC).

However, if there is a possibility that a cross-talk with an adjacent track occur as described above, the sector synchronization pattern for pre-pits exist in a frame 1 rather than the frame 0 (ODD SYNC pattern).

Similarly, a data pattern indicating address information or the like about pre-pits (bit 0 or 1) exists only in EVEN frames of frames 2 to 25. The data pattern may also exist in ODD frames if there is a possibility that the pre-pit positions in the EVEN frames overlap with the pre-pit positions in an adjacent track.

That is, one sector contains one pre-pit SYNC pattern and 12-bit pre-pit data pattern. Of the 12 bits of the data pattern, the first 4 bits represent a 4-bit sector address, which represents sector address information (relative address) in the 16 sectors forming one ECC block.

Pre-pit information data is composed of the remaining 8 bits of the 16 sectors (that is, 16 bytes), and an address value is assigned to each ECC block.

In addition, as shown in FIG. 1, the laser driving circuit 25 adjusts the laser power based on the input modulation signal to form a mark or space on the optical disk 11.

The matrix amplifier 15 generates a push-pull signal from the result of subtraction of reproduction signals in the tracking direction obtained from the quadrant photo detector in the pick-up 12. The push-pull signal is passed through a band pass filter (BPF) having a narrow band frequency characteristic centered on a predicted frequency (about 140 kHz for a normal speed) to generate a wobble signal. Furthermore, the push-pull signal is passed through a high pass filter (HPF) capable of extraction on the order of several channels to generate a pre-pit signal.

The wobble signal is input to a wobble PLL circuit 26, and the PLL arrangement generates a stable locked wobble.

Figure 3:
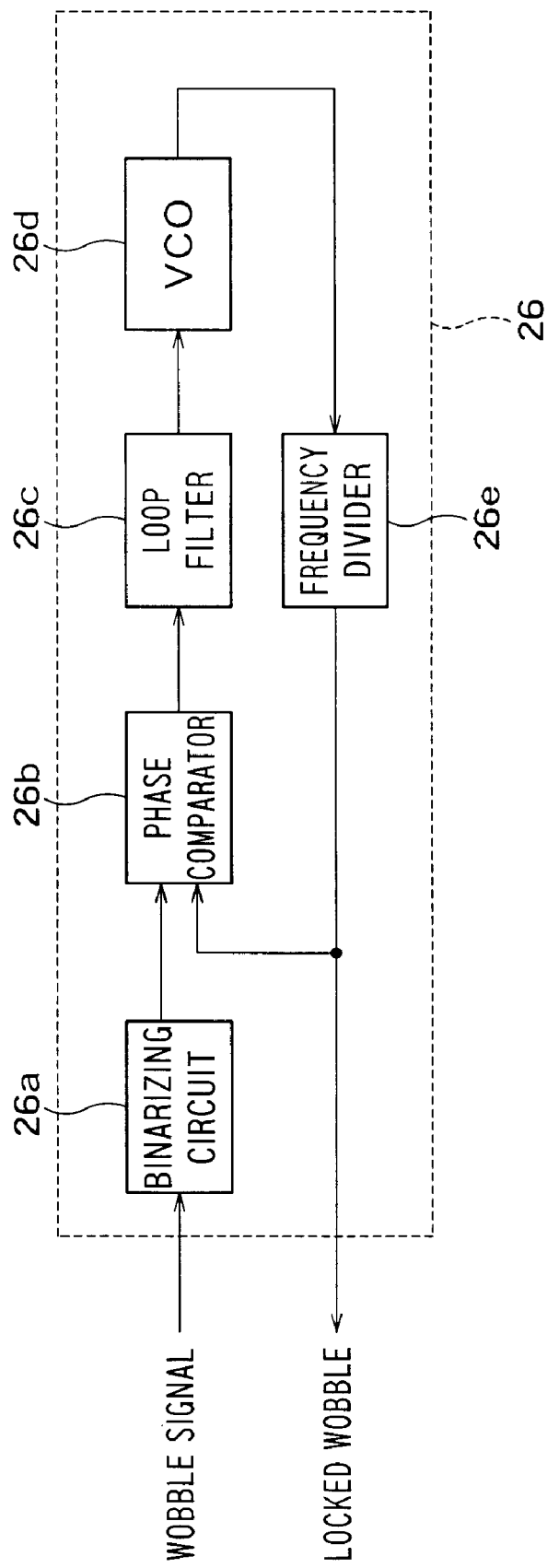
FIG. 3 is a diagram showing a configuration of essential parts of the wobble PLL circuit 26 in the optical disk recording device 100 according to the embodiment.

FIG. 3 is a diagram showing a configuration of essential parts of the wobble PLL circuit 26 in the optical disk recording device 100 according to the embodiment.

As shown in FIG. 3, the wobble PLL circuit 26 has a binarizing circuit 26a that receives and binarizes the wobble signal, a phase comparator 26b that receives the output of the binarizing circuit 26a and the locked wobble and outputs a signal, a loop filter 26c that filters the output of the phase comparator 26c, a voltage controlled oscillator (VCO) 26d that outputs an oscillation signal according to the output of the loop filter 26c, and a frequency divider 26e that divides the frequency of the output of the voltage controlled oscillator 26d and outputs the locked wobble.

In addition, as shown in FIG. 1, a pre-pit decoder 27 outputs a binarized pre-pit signal based on the pre-pit signal output from the matrix amplifier 15.

Figure 4:
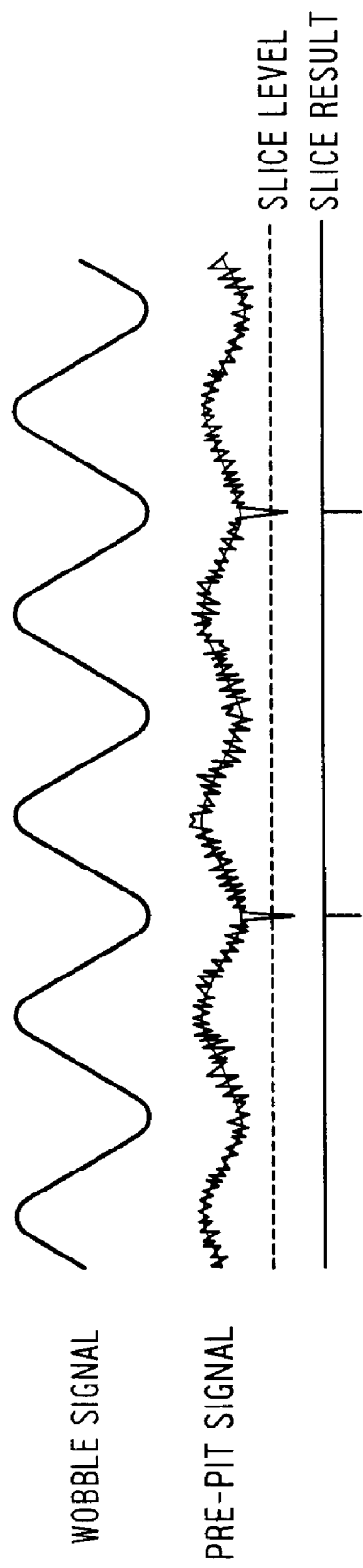
FIG. 4 is a diagram showing a slice level and a result of slicing of the pre-pit signal described above.

FIG. 4 is a diagram showing a slice level and a result of slicing of the pre-pit signal described above. As shown in FIG. 4, since the high frequency component of the pre-pit signal is not removed, the pre-pit signal has a waveform containing certain noise component due to the effect of user data (radio frequency (RF) signal). The pre-pit decoder 27 can generate the binarized pre-pit signal by slicing the pre-pit signal at a predetermined level as shown by the waveform (binarizing).

The pre-pit decoder 27 outputs a wobble counter value based on the locked wobble input from the wobble PLL circuit 26 (stable wobble clock locked to the PLL) and the binarized pre-pit signal.

Now, an operation of the pre-pit decoder 27 will be described in detail.

Figure 5:
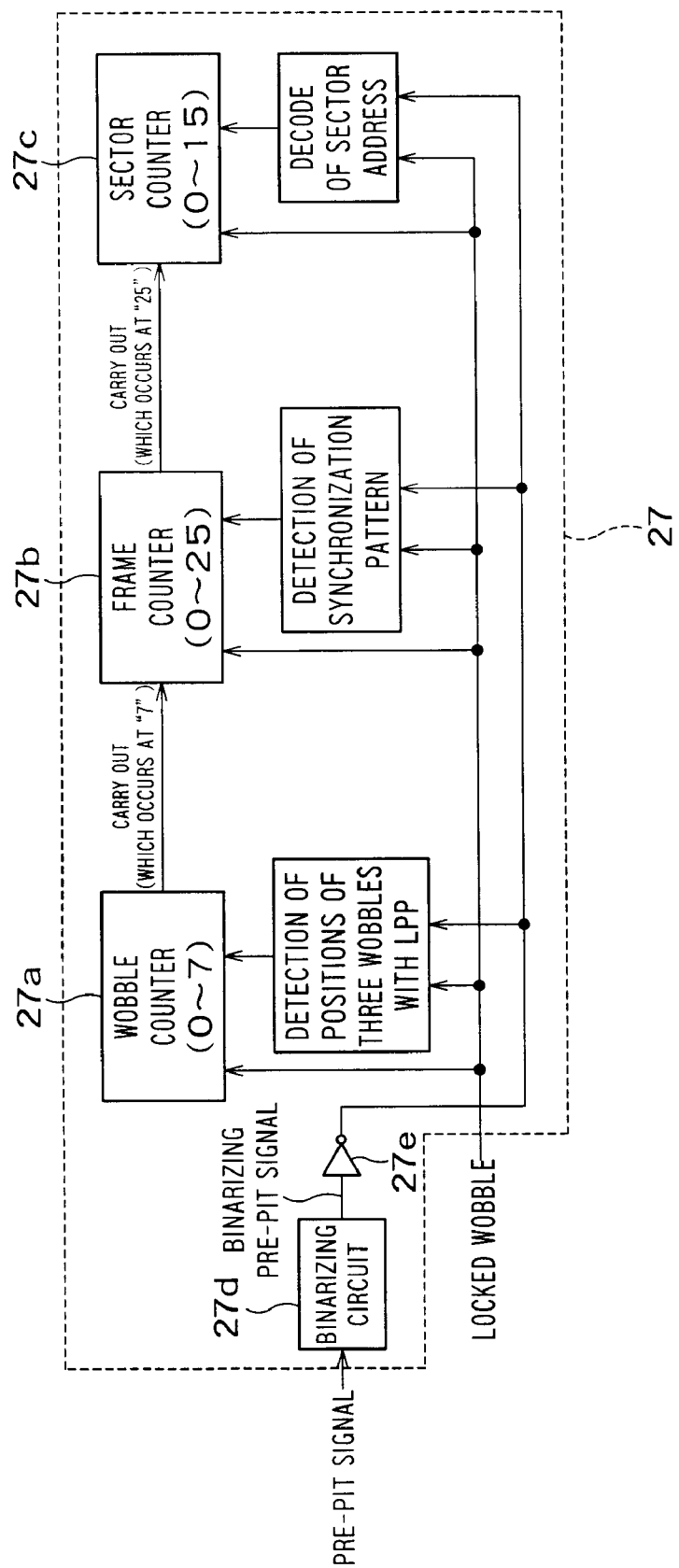
FIG. 5 is a diagram showing a configuration of essential parts of the pre-pit decoder 27 of the optical disk recording device 100 according to the embodiment.
Figure 6:
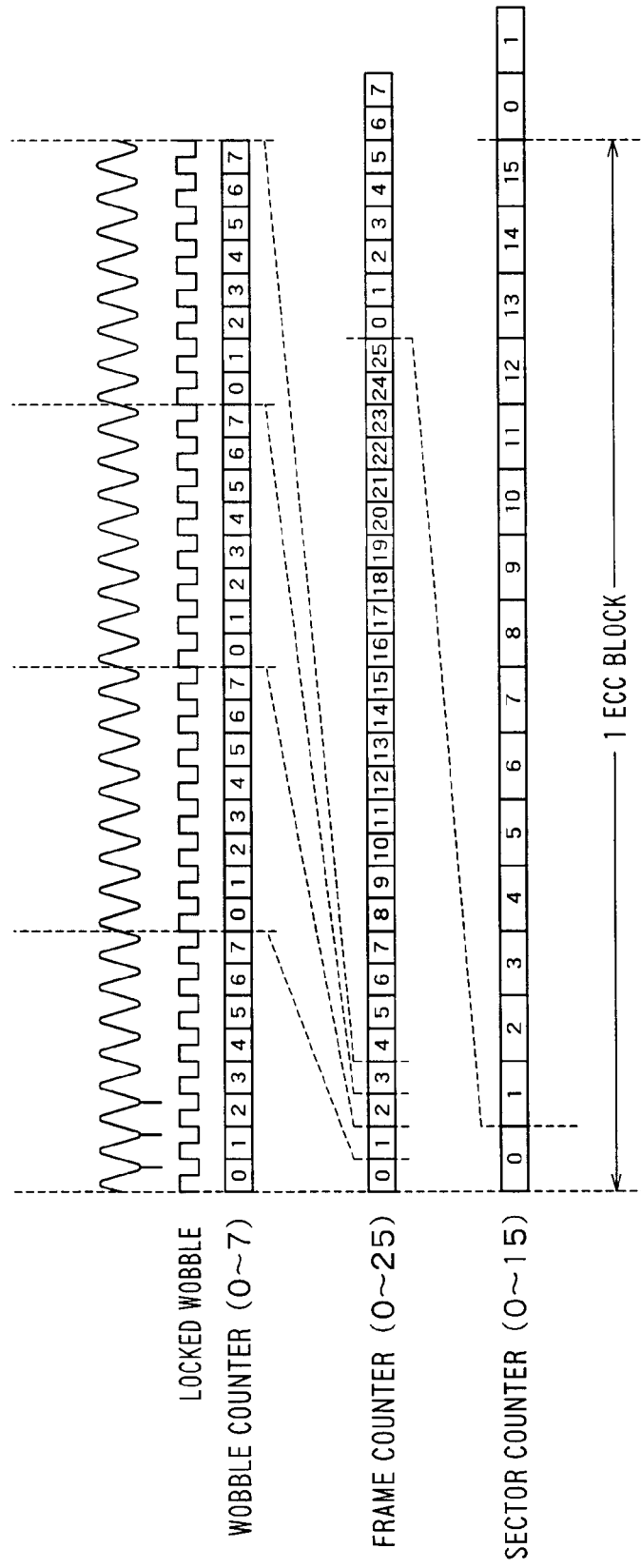
FIG. 6 is a diagram showing outputs of components of the pre-pit decoder shown in FIG. 5.

FIG. 5 is a diagram showing a configuration of essential parts of the pre-pit decoder 27 of the optical disk recording device 100 according to the embodiment. FIG. 6 is a diagram showing outputs of components of the pre-pit decoder shown in FIG. 5.

An operation of each component will be first described. It is determined whether a binarized pre-pit exists within one clock of locked wobble. If a pre-pit exists within a locked wobble, the pre-pit decoder 27 generates "1" as a result of decoding. If no pre-pit exists within a locked wobble, the pre-pit decoder 27 generates "0" as a result of decoding. Synchronizing counter for pre-pit decoding makes a count according to the locked wobble. The counter is composed of three counters, a wobble counter 27a, a frame counter 27b and a sector counter 27c in ascending order of significance. A binarizing circuit 27d slices the pre-pit signal. The output of the binarizing circuit 27d is output as the binarized pre-pit via an inverter 27e.

A whole operation will now be described. As shown in FIG. 6, first, three wobble periods in which the wobble counter (0 to 7), the lowest-significant counter, provides values "0" to "2" are aligned with the three wobble positions where a pre-pit can exist.

Then, the SYNC pattern, which is a bit sequence "11100000" (EVEN SYNC) or bit sequence "11000000" (ODD SYNC) based on the presence or absence of a pre-pit for each wobble, is detected. Then, the value of the frame counter (0 to 25), the middle significant counter, is adjusted to be "0" if the EVEN SYNC pattern is detected or to be "1" if the ODD SYNC pattern is detected.

Then, sector pointer information (relative address) represented by 4 bits of pre-pits obtained during 8 frame periods in which the frame counter value is "2" to "9" is decoded from a bit-0 pre-pit bit pattern ("10000000") or a bit-1 pre-pit bit pattern ("10100000"), and the value of the sector counter (0 to 15), the most significant counter, is adjusted.

Synchronization is achieved by the procedure described above to ensure synchronization protection in case where a bit pattern, a SYNC pattern or a sector pointer does not appear at a desired position due to a scratch, noise or the like. In the steady state, each counter operates as shown in FIG. 6. In this state, the pre-pit data (16 bytes) formed for each ECC block is decoded.

By previously setting an upper limit number of times of the synchronization protection, the synchronization protection is released and re-locked when a mistracking, a PLL slip of a locked wobble or the like occurs.

In addition, as shown in FIG. 1, the RF signal output from the matrix amplifier 15 is output to the host computer 75 through a demodulating circuit 18, an error correcting circuit 19, the correcting RAM 20, the data buffer circuit 21 and the data buffer RAM 22.

On the other hand, during recording, recording data from the host computer 75 is input to the modulating circuit 24 through the data buffer circuit 21, the data buffer RAM 22 and the parity generating circuit 23.

The modulating circuit 24 performs a modulation on the recording data with a parity added thereto to generate a modulated signal and outputs the modulated signal to the laser driving circuit 25.

The laser driving circuit 25 drives a recording laser to write the recording data to the optical disk 11. The error correcting circuit 19, the data buffer circuit 21 and the parity generating circuit 23 operate in synchronization with a clock output from the signal processing clock PLL 32.

The modulating circuit 24 operates in synchronization with a recording clock generated by a recording clock generating circuit 30. The recording clock generating circuit 30 generates the recording clock based on the wobble clock output from the wobble PLL circuit 26 (the locked wobble obtained by fixing the phase of the wobble signal having a period corresponding to the wobble of the optical disk 11).

A servo-system error signal output from the matrix amplifier 15 drives a feeding motor 14, and a tracking actuator and a focus actuator in the pick-up 12 via the servo controlling circuit 16 and a driving circuit 17.

The pre-pit decoder 27 generates a recording start timing signal from the decoded pre-pit information and outputs the recording start timing signal to the modulating circuit 24.

The modulating circuit 24 determines the recording start timing based on any of the recording start timing signal based on the pre-pits input from the pre-pit decoder 27 described above and a recording start timing signal obtained from previously recorded data input from the demodulating circuit 18.

A disk motor controlling circuit 29 selects any of a reproduction synchronization signal, a locked wobble and an FG signal and compares the selected signal and a predetermined frequency division signal from a quartz oscillator 76. Based on the comparison result, the disk motor controlling circuit 29 outputs a signal to a disk motor driver 28 to control the disk rotation by a disk motor 71.

The optical disk recording device 100 further has a pre-pit distribution detecting circuit 103 that detects the distribution of pre-pits for a plurality of wobbles based on the binarized pre-pit signal obtained by binarizing the pre-pit signals corresponding to the positions of pre-pits on the optical disk 11 and the wobble counter value obtained by counting the binarized pre-pit signals in synchronization with the locked wobble and a wobble slip determining circuit 104 that determines the amount of the shift of the recording position for each wobble with respect to a desired recording position by comparing the pre-pit distribution detected by the pre-pit distribution detecting circuit 103 and a reference pre-pit distribution corresponding to the desired recording position.

The optical disk recording device 100 further has a phase difference generating circuit 101 that produces a sawtooth wave each of whose unit waves corresponds to the address value assigned to one wobble according to the recording clock with reference to the time of start of recording (a counter value associated with the wobble phase that is obtained by dividing the frequency of the recording clock and counting the frequency-divided recording clocks) and an in-wobble recording position shift detecting circuit that holds the counter value in synchronization with the binarized pre-pit signal and detects the shift of the recording position based on the held counter value.

The optical disk recording device 100 further has a recording position controlling circuit 105 that outputs, to a system controller 31, a signal for controlling the recording clock generating circuit 30 (recording clock control information) or a signal for stopping the recording to the optical disk (recording position shift information), for example, based on at least any of the result of the determination by the wobble slip determining circuit 104 and the result of the detection by the in-wobble recording position shift detecting circuit 102.

The recording position controlling circuit 105 outputs the signal for controlling the recording clock generating circuit 30 in the case where the wobble slip determining circuit 104 determines that no recording position shift occurs for each wobble and the in-wobble recording position shift detecting circuit 102 detects a recording position shift. Thus, the recording clock generating circuit 30 corrects the phase of the recording clock to correct the recording position to a desired recording position.

Now, a process of the recording position shift of the optical disk 100 configured as described above will be described.

Figure 7:
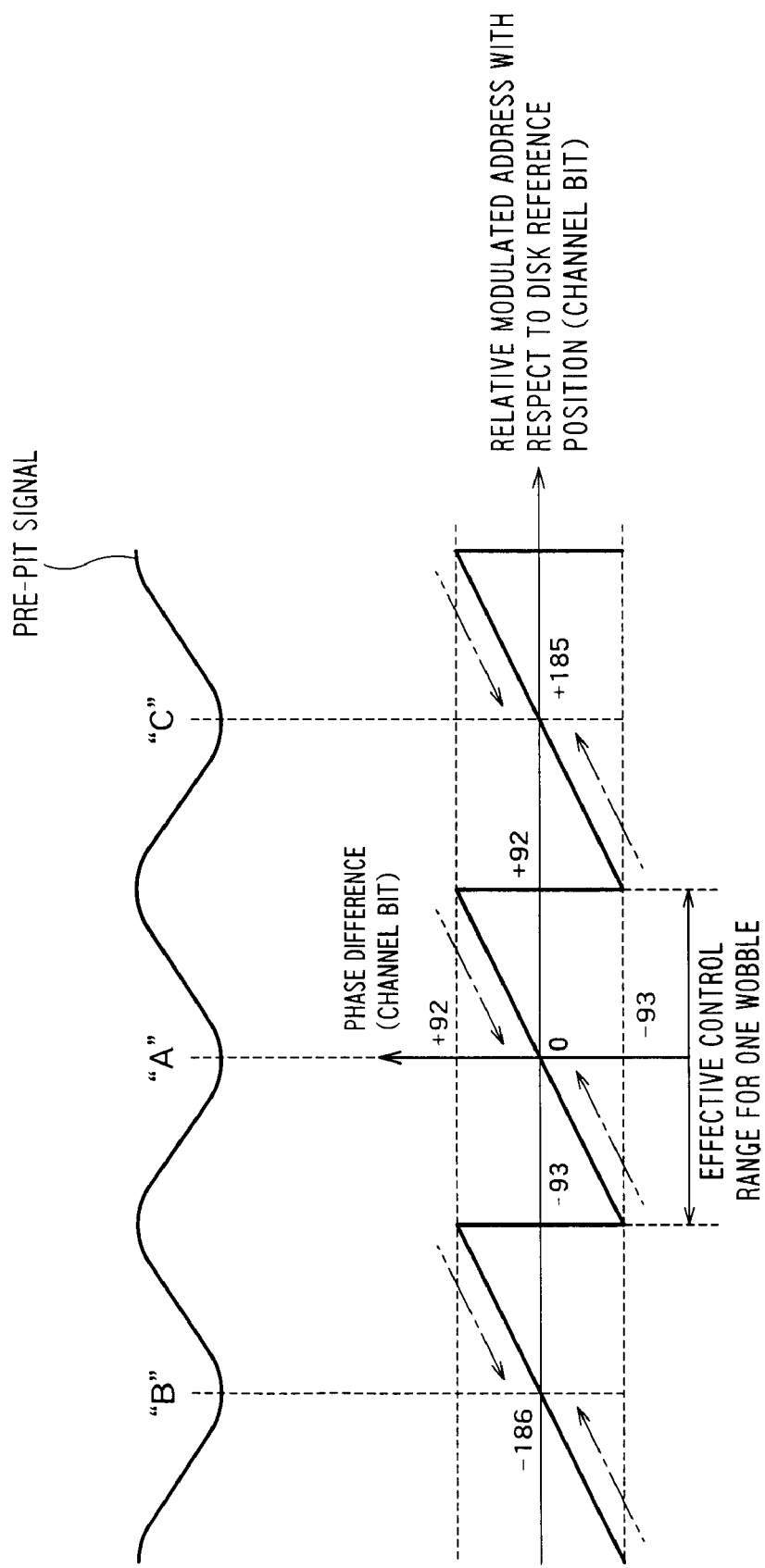
FIG. 7 is a diagram for illustrating detection of a recording position shift in one wobble according to the embodiment.

First, detection of a recording position shift in one wobble (±½ wobble) will be described. FIG. 7 is a diagram for illustrating detection of a recording position shift in one wobble according to the embodiment.

According to the method of detecting a recording position shift in one wobble, the phase difference of a sawtooth wave is detected with a channel bit precision from the relationship between a modulated address and a detected pre-pit position in one wobble. And the recording position is controlled to converge in the directions indicated by the arrows in FIG. 7.

As described above, the modulating circuit 24 shown in FIG. 1 generates the recording start timing signal (the timing is typically the leading edge of an ECC block) based on the demodulation information about the pre-pit or recording data. When the phase difference generating circuit 101 receives the recording start timing signal, the phase difference generating circuit 101 starts frequency division of the recording clock by 186.

Then, the phase difference generating circuit 101 generates a sawtooth wave shown in FIG. 7 (which corresponds to the address values −93 to +92) with such a phase that the physical positions of the wobbles agree with the modulated addresses, that is, the recording positions in the format of the optical disk (the phase difference is −93 to +92).

The in-wobble recording position shift detecting circuit 102 holds the phase of the sawtooth wave input thereto in synchronization with the binarized pre-pit signal, thereby obtaining recording position shift information.

In order to enhance protection in case of erroneous pre-pit detection, the sawtooth wave for obtaining the phase difference information may be generated only in the three wobble periods in which a pre-pit can occur and be masked in the remaining periods.

The recording position shift information is obtained each time a pre-pit occurs. In order to enhance protection in case of erroneous pre-pit detection, the information may be thinned out by using only the result for the pre-pit that exists in the leading one of every 8 wobbles, for example.

In addition, a window (±8 channels, for example) may be provided in the obtained phase difference information, and the phase difference information in the window may be masked. This is because the detection result cannot be always "0", so that an oscillation can occurs if the detection result is fed back to the phase of the recording clock.

The detection of a recording position shift in one wobble is conducted only based on the detected pre-pit position. Therefore, the address information obtained by the pre-pit decoder for each wobble described above is not necessary.

As a result, even if the pre-pit detection probability is relatively low, the recording position can be controlled stably as far as the number of erroneous detections is low.

However, if the recording position shift exceeds ±½ wobble, the recording position that has to converge to the point "A" in FIG. 7 is controlled to converge the point "B" or "C", which are the top of the adjacent wobbles. Thus, the effective range of the recording position control is ±½ wobble.

By the configuration and operation described above, shift information for each channel is obtained as the recording position shift information.

In the obtained recording position shift information for each channel bit, a phase modulation of the wobble signal is reflected although it is not necessary to stop the recording. Thus, an operation to recover the recording position to the correct position has to be performed.

Now, an operation of reflecting the recording position shift information in the recording clock phase will be described.

Figure 8:
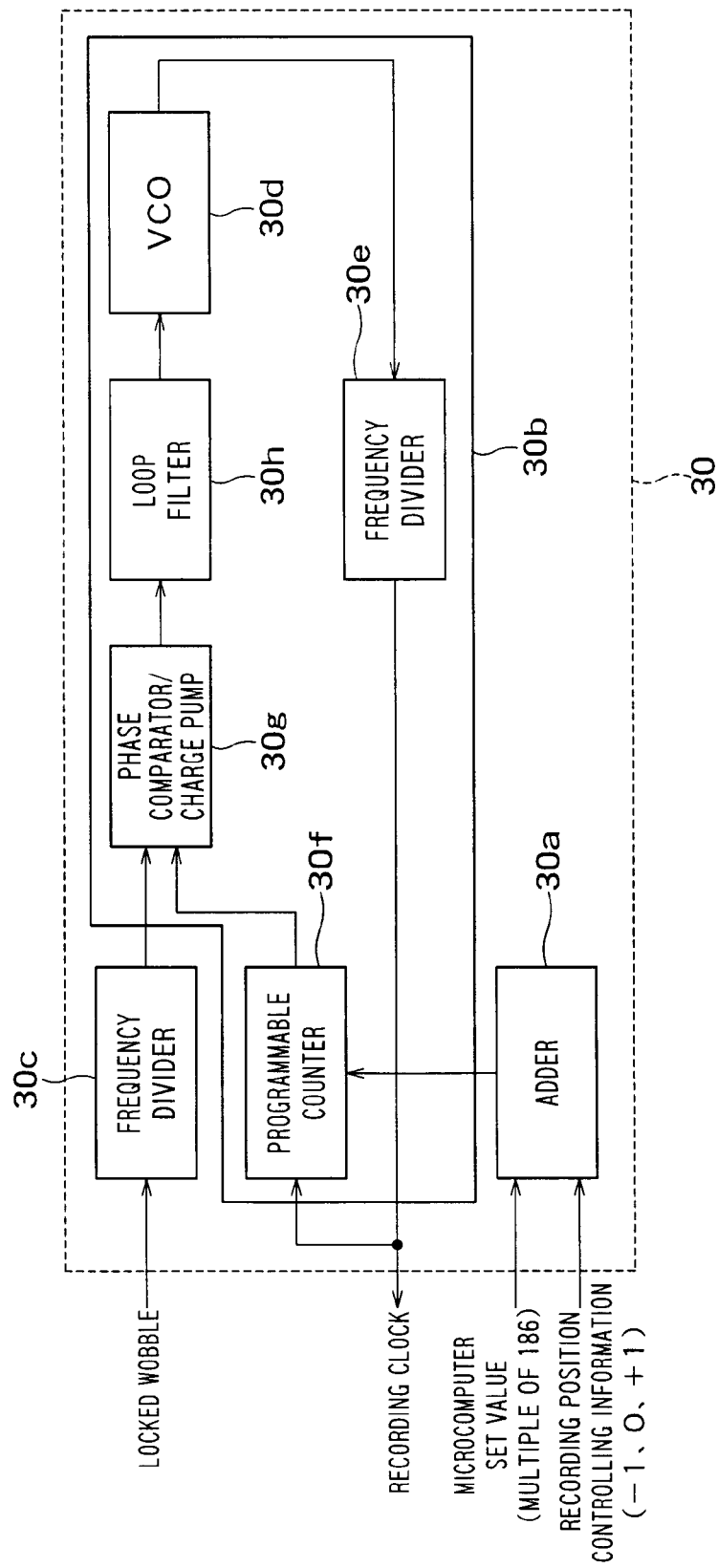
FIG. 8 is a diagram showing a configuration of essential parts of the recording clock generating circuit 30 of the optical disk device 100 according to the embodiment.

FIG. 8 is a diagram showing a configuration of essential parts of the recording clock generating circuit 30 of the optical disk device 100 according to the embodiment.

As shown in FIG. 8, the recording clock generating circuit 30 has an adder 30*a* that receives a frequency division set value from a microcomputer at one input and the recording position control information at the other input, a PLL circuit 30*b* connected to the adder 30*a*, and a frequency divider 30*c* that receives the locked wobble and outputs a signal obtained by dividing the frequency of the locked wobble to the PLL circuit 30*b*. Although the frequency division set value from the microcomputer is shown as "a multiple of 186" in FIG. 6, the frequency division set value actually varies with the type of the disk, the recording speed or the like.

The PLL circuit 30*b* has a voltage controlled oscillator (VCO) 30*d* that outputs a clock, a frequency divider 30*e* that divides the frequency of the output clock, a programmable counter 30*f* that receives a frequency division correcting signal output from the adder 30*a* and the frequency-divided output clock, a phase comparator/charge pump 30*g* that receives the output of the programmable counter 30*f* at one input and the output of the frequency divider 30*c* at the other input, and a loop filter 30*h* that interconnects the voltage controlled oscillator 30*d* and the phase comparator/charge pump 30*g*.

The frequency divider 30*c* divides the frequency of the locked wobble.

The phase comparator/charge pump 30g outputs a voltage proportional to the phase difference between the clock output from the programmable counter 30f and the clock output from the frequency divider 30c.

In FIG. 8, for example, it is assumed that the frequency division number of the frequency divider 30c is set at "1", the frequency division number of the frequency divider 30e is set at "4", and the microcomputer set value is set at "186". In this case, the center frequency of the voltage controlled oscillator 30d oscillates at a rate four times higher than the recording clock, that is, the channel rate. These values are determined systematically based on the type of the disk, what multiple of the normal recording speed, the oscillation limit of the voltage controlled oscillator, or the like.

Here, there will be described operations of the in-wobble recording position shift detecting circuit 102 and the recording position controlling circuit 105 that control the recording clock generating circuit 30 described above. In the following description, it is assumed that the wobble slip determining circuit 104 provides no information to the recording position controlling circuit 105.

Figure 9:
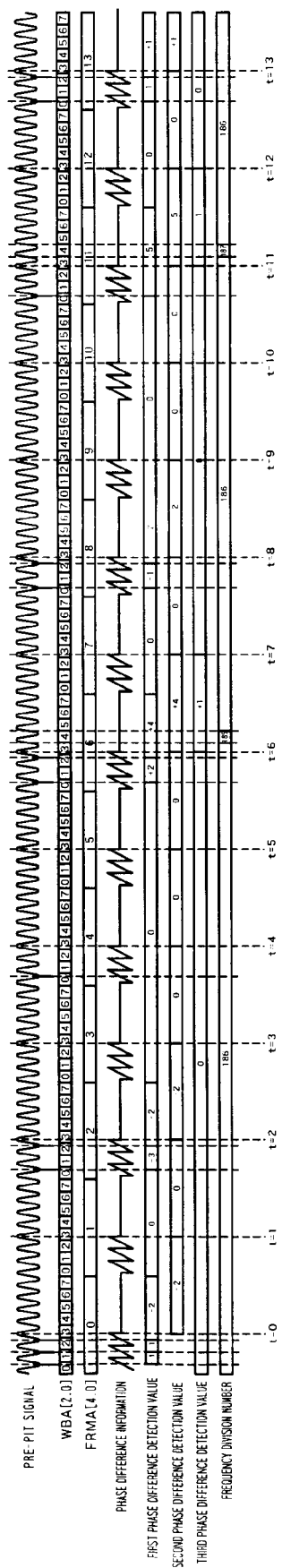
FIG. 9 is a timing chart for illustrating an operation of reflecting information about a recording position shift within one wobble (±½ wobble) in the recording clock phase.

FIG. 9 is a timing chart for illustrating an operation of reflecting information about a recording position shift within one wobble (±½ wobble) in the recording clock phase.

In FIG. 8, the frequency divider 30c divides the frequency by one, the frequency divider 30e divides the frequency by four, and the microcomputer-set initial value loaded to the programmable counter 30f is "186". When the recording starts, a sawtooth wave indicating the phase difference information according to the recording clock is generated by a divide-by-186 counter so that the phase thereof agrees with ideal wobble positions.

Here, for the sawtooth wave, "−186" to "+185" are counted on the assumption that the position of the top of each wobble, that is, the position where a pre-pit can exist, is "0". Here, in order to minimize the damage of an erroneous pre-pit detection, the sawtooth wave is generated only when the wobble counter value is "0" to "2", at which a pre-pit can exist. At the positions where no pre-pit can exist, the sawtooth wave is forcedly set at "0". The value represented by the phase difference information in the form of the sawtooth wave held in synchronization with the pre-pit detection signal is a first phase difference detection value.

As described above, a certain phase modulation is added to the wobble signal according to the disk rotation. And the phase difference information is indicated by the sawtooth wave generated according to the recording clock generated based on the wobble. Thus, as shown in the timing chart, the phase difference information inevitably provides a certain phase difference with respect to the pre-pit position.

The first phase difference detection value is cleared at the point where generation of the sawtooth wave is started, or in other words, when the wobble counter value is "0". As a result, the first phase difference detection value remains at the cleared value "0" at the point where generation of the sawtooth wave is completed in a frame in which no pre-pit exists (for example, "FRMA"="1" in FIG. 9).

Furthermore, the first phase difference detection value is determined each time a pre-pit is detected, and excessive information is obtained at a part where many pre-pits are concentrated. Thus, in this example, the first phase difference detection values are thinned out for each frame to provide a final detection value, and the final detection value is used as a second phase difference detection value.

The second phase difference detection value is determined at points in time "t"=0, 1, 2, 3, . . . , 13, at which the wobble counter value is "3" in each frame. The second phase difference detection value is determined by holding the first phase difference detection value for each frame. Thus, a value other than "0", that is, a phase difference value can occur only in any of the EVEN frame and the ODD frame in which a pre-pit exist. The second phase difference detection value is masked to be "0" for the frames in which no pre-pit exists.

A third phase difference detection signal is obtained by applying a window (±3 channel) to the second phase difference detection value, masking the phase difference value in the window to be "0", and limiting phase difference values of "−4" or smaller, which are out of the window, to "−1" and phase difference values of "+4" or larger, which are out of the window, to "+1".

The window is applied in order to minimize the damage of an erroneous pre-pit detection and to avoid abrupt recording phase recovery, which affects the reproduction performance. Furthermore, the window is applied in order to prevent oscillation of the recording clock generating operation as described above.

As described above, if the third phase difference detection value is "+1", it means that the recording position is shifted in the advance direction by three or more channels, and if the third phase difference detection value is "−1", it means that the recording position is shifted in the lag direction by three or more channels.

Now, an operation of feed backing the phase difference information thus obtained to the recording clock phase will be described.

Three third phase difference detection values of "−1", "0" and "+1" are input to the adder 30a in the recording clock generating circuit 30.

The adder 30a is set at the initial value "186" previously set by the microcomputer, and the phase difference detection value is subtracted from "186".

As a result, the output of the adder varies in such a manner that the output of the adder is "187" (186−(−1)) when the phase difference detection value is "−1", the output of the adder is "186" when the phase difference detection value is "0", and the output of the adder is "185" (186−(+1)) when the phase difference detection value is "+1".

The clock obtained by the frequency divider 30e dividing by four the original oscillation of the voltage controlled oscillator 30d is further divided by the output result of the adder 30a by the programmable counter 30f.

The result is input to the phase comparator/charge pump 30g, and the phase comparator/charge pump 30g operates in the following manner when the programmable counter value is not the center value "186".

When the output result of the adder 30a is "185", the output of the frequency divider 30e leads the locked wobble in the phase comparator/charge pump 30g, and a phase error occurs in the advance direction of the recording clock. The loop operates to eliminate the phase error. As a result, the recording clock is controlled to lag (that is, so that the recording position is shifted in the lag direction).

On the other hand, when the output result of the adder 30a is "187", the recording clock is controlled to advance (that is, so that the recording position is shifted in the advance direction).

As described above, if it is determined that the recording position is shifted in the advance direction (the third phase difference detection value is "+1"), the recording clock is adjusted in the lag direction, and if it is determined that the recording position is shifted in the lag direction (the third phase difference detection value is "−1"), the recording clock is adjusted in the advance direction. The control gain (recovery amount) may be variable.

As shown in FIG. 9, for example, the gain is set at the minimum value "1", and only for one wobble period for which the wobble counter value ("WBA[2:0]") is "4" after it is known that the third phase difference detection value is a value other than "0", the value "±1" is added to the frequency division number "186".

Thus, the recovery amount is maintained to be one channel, and there is a possibility that the phase difference detection result occur which exceeds the window range for the subsequent pre-pit. In this case, the value "±1" is added for the subsequent pre-pit position, and the recording position is recovered slowly.

If it is desired that the recording phase is recovered faster (in larger steps), the control period may be expanded. For example, the control may be performed for three wobble periods for which the wobble counter value "WBA[2:0]" is "4", "5" and "6". In this case, the phase error amount of one channel is accumulated for three periods, so that the recovery amount is 3 channels. In this example, the gain (recovery amount) can be increased to "8" at the maximum.

While the control amount for one wobble period is limited to ±1 this example, the control amount may be changed to ±2, 3 . . . in order to achieve faster recovery.

In this way, detection of a recording position shift and control of the recording position within one wobble (±½ wobble) are achieved.

In the following, an operation of detecting a recording position shift exceeding one wobble (±½ wobble) will be described.

This operation may be performed solely in the optical disk recording device 100. However, essentially, it is preferred that this operation is performed in combination with the detection of a recording position shift within one wobble (±½ wobble).

Detection of a recording position shift exceeding ±½ wobble is performed primarily by the pre-pit distribution detecting circuit 103 and the wobble slip determining circuit 104.

Figure 10:
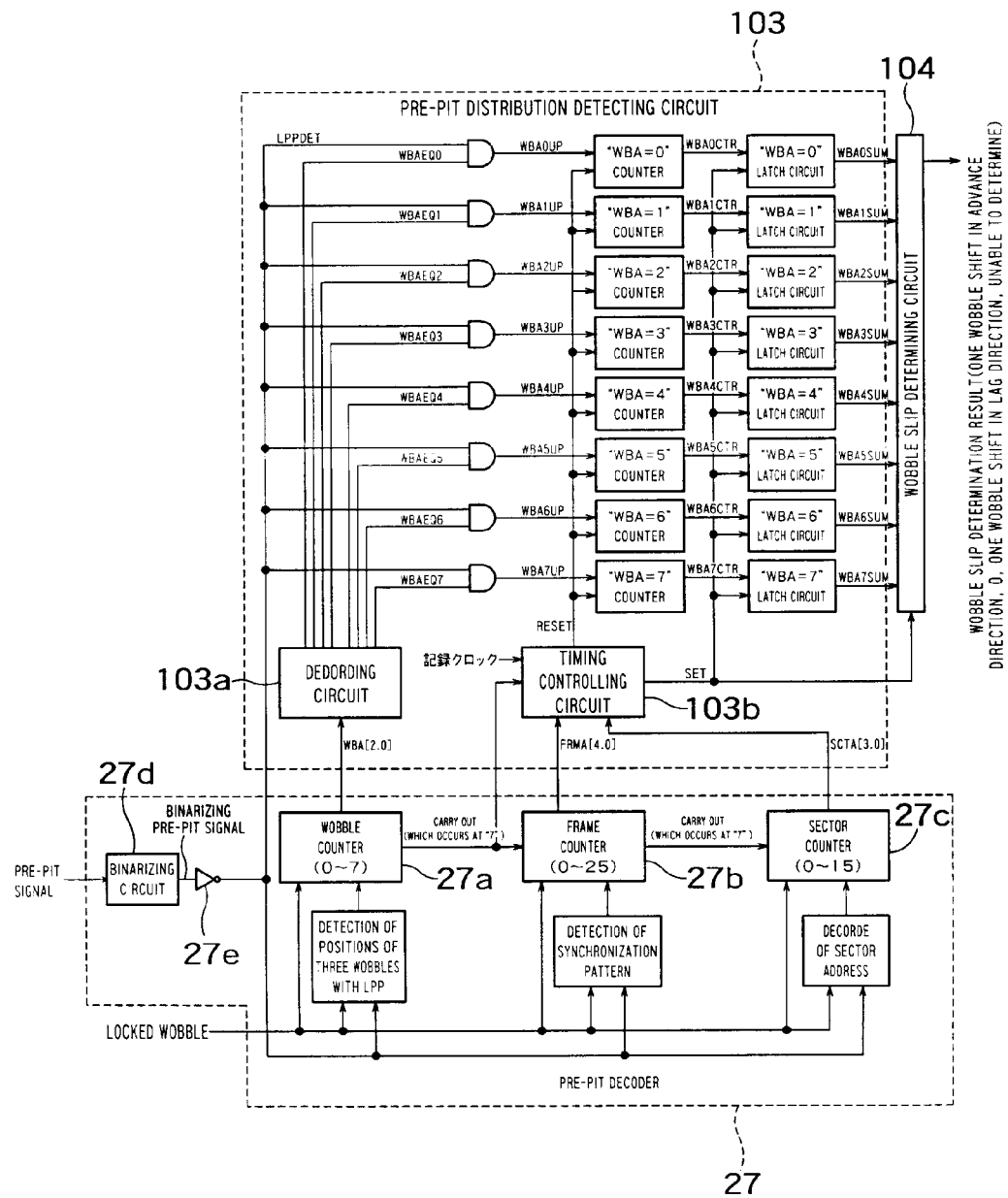
FIG. 10 is a diagram showing a configuration of essential parts of the pre-pit decoder 27, the pre-pit distribution detecting circuit 103 and the wobble slip determining circuit 104.

FIG. 10 is a diagram showing a configuration of essential parts of the pre-pit decoder 27, the pre-pit distribution detecting circuit 103 and the wobble slip determining circuit 104.

As for the operation of the pre-pit decoder 27, as described above, it is determined whether a binarized pre-pit is present or absent in each wobble, and any pre-pit is decoded using the synchronizing counters 27a, 27b and 27c that make a count according to the locked wobble.

In this embodiment, the synchronizing counters 27a, 27b and 27c for pre-pit decoding have to be inhibited from being resynchronized with each other after the recording is started. That is, the synchronizing counters 27a, 27b and 27c have to be kept in a free run state during recording.

The pre-pit distribution detecting circuit 103 receives the binarized pre-pit signal (LPPDET), the values of the synchronizing counters and a carrier signal (which occurs when "WBA[2:0]"="7") of the value ("WBA[2:0]") of the wobble counter, the lowest significant counter from the pre-pit decoder 27.

A decoding circuit 103a in the pre-pit distribution detecting circuit 103 decodes the value of the input wobble counter value "WBA[2:0]" and outputs a decode result signal "WBAEQ[7:0]". The output result and the "LPPDET" signal are input to a two-input AND, and the AND generates a "WBA[7:0]UP" signal. The "WBA[7:0]UP" signal is input as a clock signal to each of "WBA=0" to "WBA=7" counters. Each of these counters receives a "RESET" signal output from a timing controlling circuit 103b and is reset at a desired timing. The output results of the "WBA=0" to "WBA=7" counters are input to "WBA=0" to "WBA=7" latch circuits, respectively, and latched with a "SET" signal output from the timing controlling circuit 103b. The latch results are output to the wobble slip determining circuit 104 in the form of "WBA [7:0]SUM" values.

Figure 11:
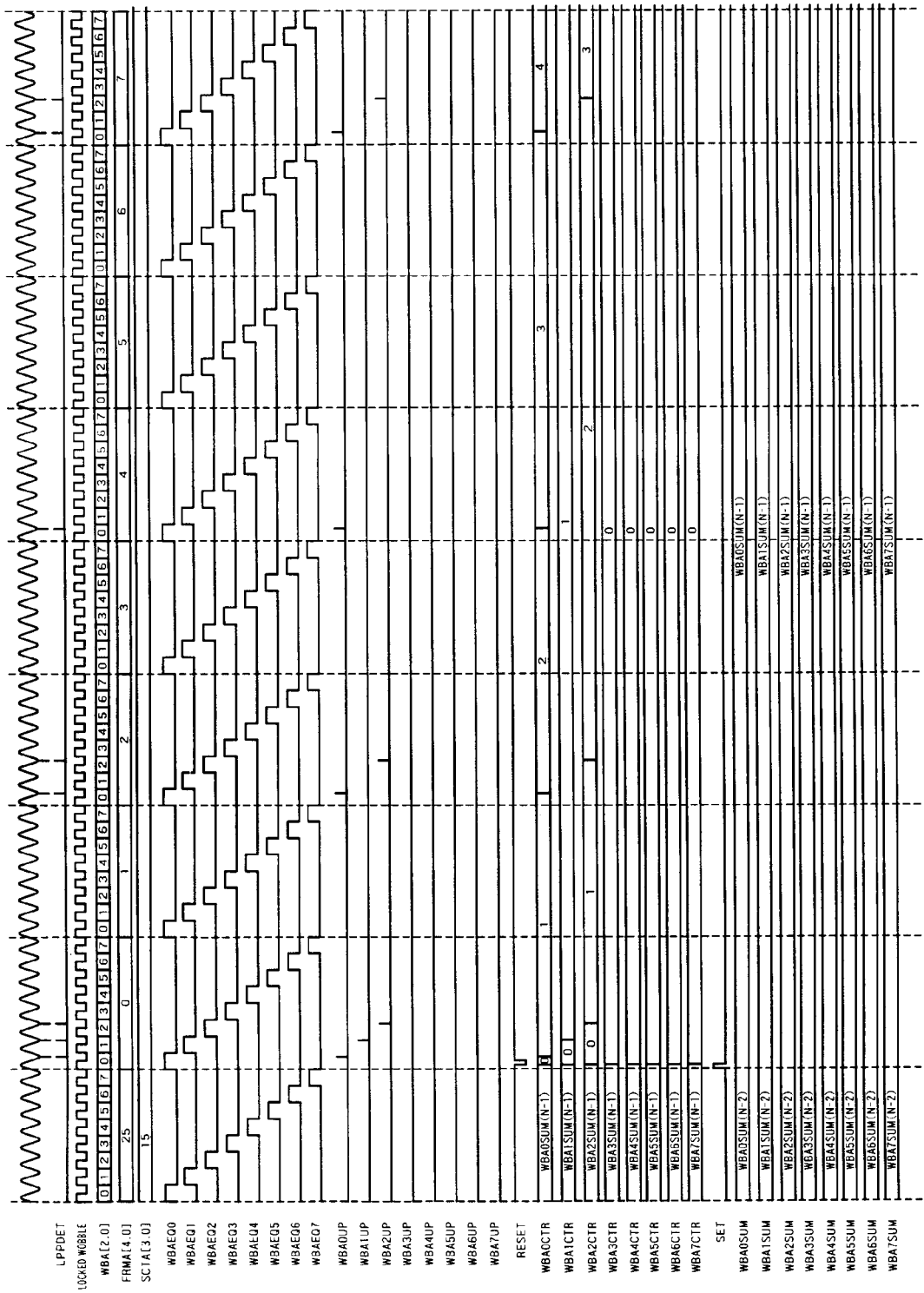
FIG. 11 is a timing chart showing output waveforms of components of the pre-pit distribution detecting circuit 103.

Now, an operation of the pre-pit distribution detecting circuit 103 configured as described above will be described. FIG. 11 is a timing chart showing output waveforms of components of the pre-pit distribution detecting circuit 103.

As shown in FIG. 11, the "WBAEQ[7:0]" signals are obtained by decoding the wobble counter values "WBA[2:0]". When the "WBA[2:0]"="0", the "WBAEQ0" signal is set at "H", when the "WBA[2:0]"="1", the "WBAEQ1" signal is set at "H", and so on. And when the "WBA[2:0]"="7", the "WBAEQ7" signal is set at "H".

The "WBA[7:0]UP" signals are results of AND operation of the "WBAEQ[7:0]" signals and the LPPDET signal. For example, in FIG. 11, at a point in time "FRMA[4:0]"="0", the EVEN SYNC pattern shown in FIG. 2B exists. Therefore, the "WBA0UP", "WBA1UP" and "WBA2UP" signals are active (the "H" pulse occurs).

In response to the "WBA[7:0]" signals, the counters "WBA[7:0]CTR" are counted up. The counters "WBA[7:0] CTR" are reset to "0" when the "RESET" signal is "L". The count results of the counters "WBA[7:0]CTR" are held when the "SET" signal is "H" and defined as "WBA[7:0]SUM" values.

The "SET" signal rises when "SCTA[3:0]"="0", "FRMA [4:0]"="0" and "WBA[2:0]"="0", that is, at the phase of the leading wobble of the ECC block.

The "RESET" signal rises to "H" after the "SET" signal rises and before a pre-pit position that can appear at a position where "WBA[2:0]"="0".

Through the procedure described above, the number of detected pre-pits ("WBA[7:0]SUM") for each of the values "0", "1", "2", . . . , "7" of the "WBA[2:0]" signals for each ECC block is determined.

Figure 12A:
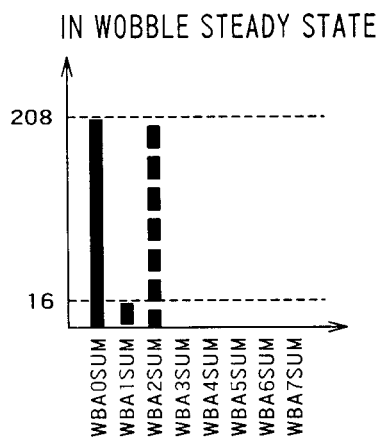
FIG. 12A is a bar graph showing "WBA[7:0]SUM" values in a case where the slice level for the pre-pit signal is appropriate.
Figure 12B:
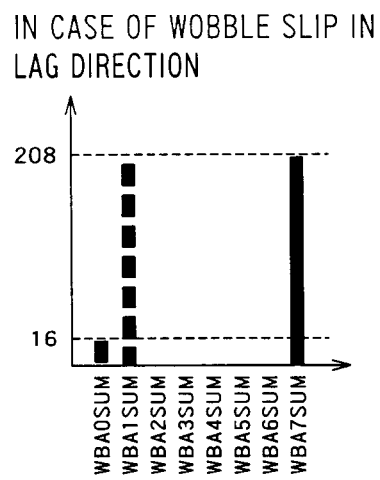
FIG. 12B is a bar graph showing "WBA[7:0]SUM" values in a case where the slice level for the pre-pit signal is appropriate.
Figure 12C:
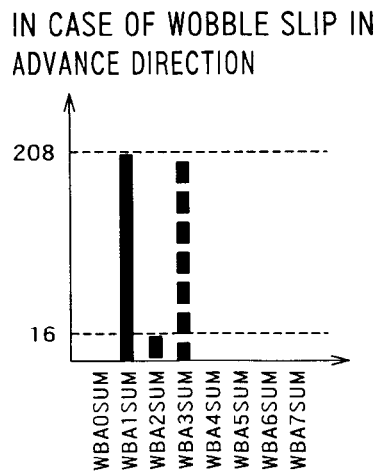
FIG. 12C is a bar graph showing "WBA[7:0]SUM" values in a case where the slice level for the pre-pit signal is appropriate.
Figure 13A:
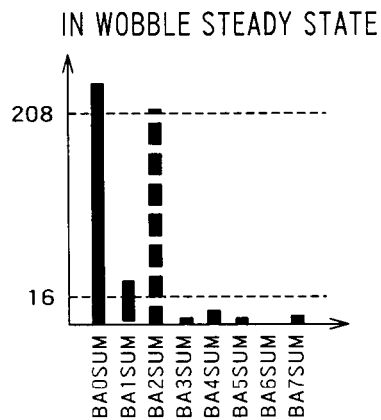
FIG. 13A is a bar graph showing "WBA[7:0]SUM" values in a case where the slice level for the pre-pit signal is high.
Figure 13B:
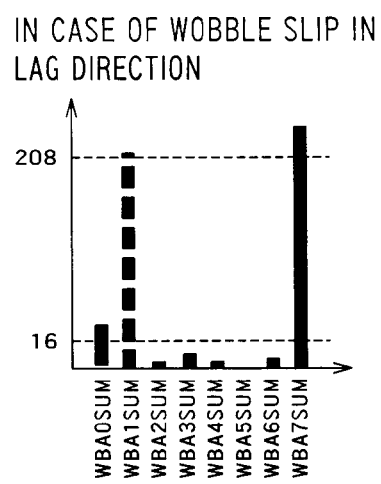
FIG. 13B is a bar graph showing "WBA[7:0]SUM" values in a case where the slice level for the pre-pit signal is high.
Figure 13C:
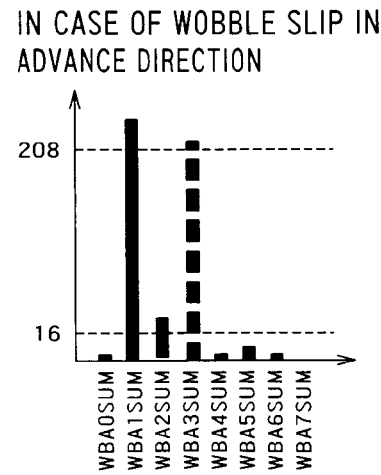
FIG. 13C is a bar graph showing "WBA[7:0]SUM" values in a case where the slice level for the pre-pit signal is high.
Figure 14A:
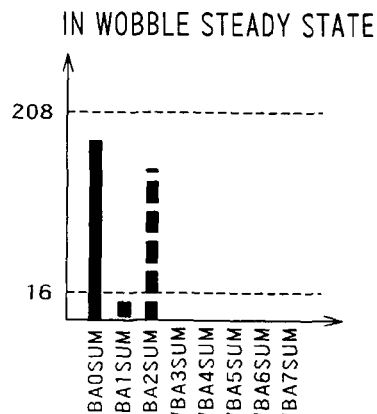
FIG. 14A is a bar graph showing "WBA[7:0]SUM" values in a case where the slice level for the pre-pit signal is low.
Figure 14B:
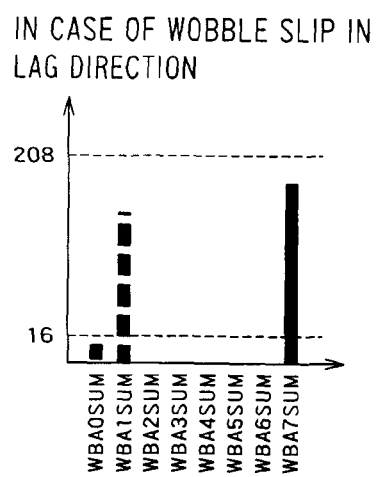
FIG. 14B is a bar graph showing "WBA[7:0]SUM" values in a case where the slice level for the pre-pit signal is low.
Figure 14C:
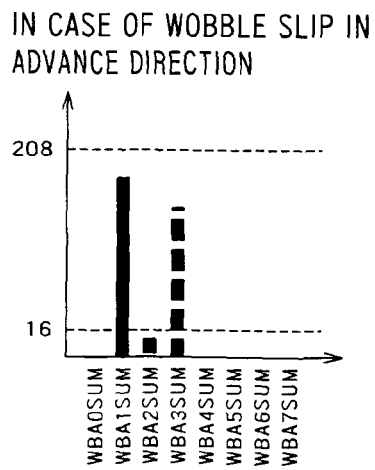
FIG. 14C is a bar graph showing "WBA[7:0]SUM" values in a case where the slice level for the pre-pit signal is low.

FIGS. 12A to 12C are bar graphs showing "WBA[7:0] SUM" values in a case where the slice level for the pre-pit signal is appropriate. FIGS. 13A to 13C are bar graphs showing "WBA[7:0]SUM" values in a case where the slice level for the pre-pit signal is high. FIGS. 14A to 14C are bar graphs showing "WBA[7:0]SUM" values in a case where the slice level for the pre-pit signal is low.

FIG. 12A shows "WBA[7:0]SUM" values in a steady state where pre-pits can be detected correctly.

As described above, the pre-pit format exists in any of the EVEN frame and the ODD frame. The bit pattern is any of "11100000", "11000000", "10100000" and "10000000".

Thus, when the value "WBA[2:0]" of the wobble counter that makes a count in a frame is "0", pre-pits exist every two frames. As a result, if the pre-pits are counted without fail, the "WBA0SUM" value is "208", which is a half of the number of frames in one ECC block (26 by 16).

Similarly, when "WBA[2:0]"="1", pre-pits exist only in the SYNC frame (frame "0" or frame "1"). As a result, if the pre-pits are counted without fail, the "WBA1SUM" value is "16", which is a half of 32, which is the number of SYNC frames (frames "0" and "1") in one ECC block.

When "WBA[2:0]"="2", pre-pits exist if the pre-pit data pattern is the bit-1 pattern, but pre-pits don't exist if the pre-pit data pattern is the bit-0 pattern. Thus, the "WBA2SUM" value is not determined. However, there is no possibility that all the pre-pit data in one ECC block is in the bit-0 pattern or bit-1 pattern. The relative address value described above assumes "0h" to "Fh". Thus, in this case, the bit-0 pattern and the bit-1 pattern each appear at least 32 times. Thus, the minimum value "32" is assured.

As for the pre-pit data other than the relative address, a parity exists according to the Reed Solomon coding. Thus, there is no possibility that all the pre-pits assume a bit "1", although there is a possibility that all the pre-pits assume a bit "0". Thus, the "WBA2SUM" value is equal to or larger than 32 and smaller than 208 and is indicated by a dashed line in the bar graph.

In the other wobble periods, because "WBA[7:3]SUM" is a position in which no pre-pit exists, so the number of detected pre-pits in one ECC block is "0", if the pre-pits can be detected without fail with such a high precision that erroneous detection does not occur.

While FIG. 12A shows a steady state, FIG. 13A shows "WBA[7:0]SUM" values in a case where the pre-pit slice level is high, and noise is likely to be detected, that is, a case where erroneous detection of pre-pits is likely to occur, for example.

As shown in FIG. 13A, since erroneous detection is likely to occur, in the "WBA[7:3]SUM" value, for which no pre-pit would otherwise exist, occurs. However, when pre-pits are erroneously detected, the possibility that detection of pre-pits fails is low. Thus, the bar graph is offset upward in whole compared with the bar graph shown in FIG. 12A.

FIG. 14A shows "WBA[7:0]SUM" values in a case where the pre-pit slice level is low, and some pre-pits fail to be detected. In this case, the bar graph is offset downward in whole compared with the bar graph shown in FIG. 12A due to the failure of detection.

FIGS. 12A, 13A and 14A all show cases where the wobble PLL operates without slip.

Figure 15:
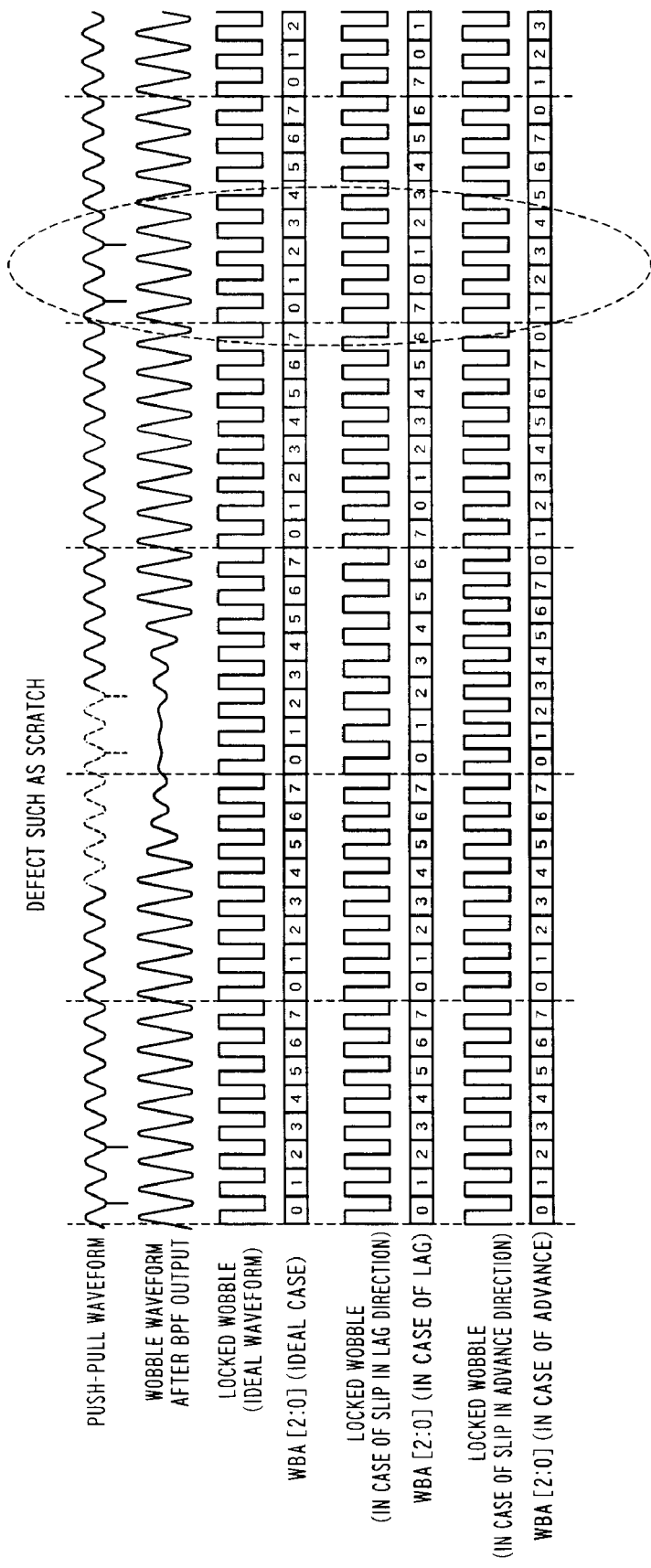

However, as described above, a situation may occur in which the wobble signal is not normally reproduced due to the effect of a scratch or the like. FIG. 15 shows a waveform of the locked wobble and wobble counter values ("WBA[2:0]") in a case where the wobble signal is not normally reproduced due to a scratch or the like.

As shown in FIG. 15, a situation may occur in which the locked wobble generated by the wobble PLL circuit 26 is shifted by one wave in the lag or advance direction.

For example, as shown in FIG. 15, if the recording position passes through a scratch, the locked wobble is shifted by one wave. As a result, as indicated by the dotted line, the pre-pit positions are shifted, and the pre-pits appear at positions "7", "0" and "1" (when a lag occurs) and the pre-pit positions are shifted, and the pre-pits appear at positions "1", "2" and "3" (when an advance occurs). Ideally, the pre-pits appear at positions where the wobble counter value ("1WBA[2:0]") is "0", "1" and "2".

In this case, the graphs of the "WBA[7:0]SUM" values in FIG. 10 are shifted as shown in FIGS. 12B, 12C, 13B, 13C, 14B and 14C.

Figure 16:
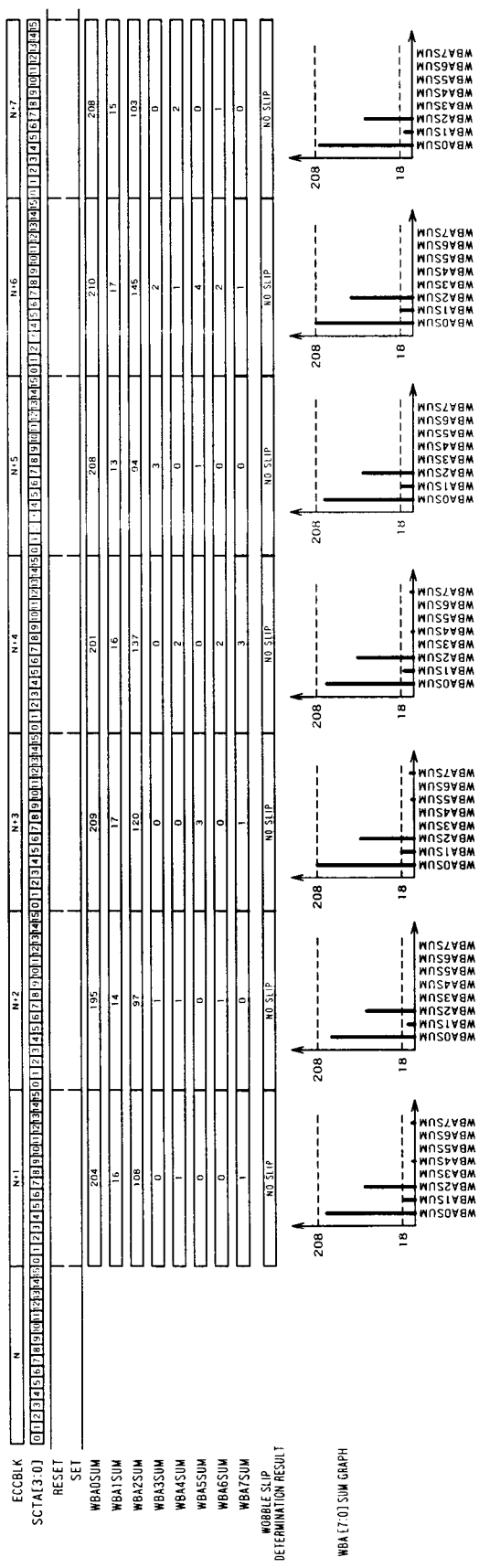
FIG. 16 is a timing chart showing temporal changes of the "WBA[7:0]SUM" values in a case where no wobble slip occurs.
Figure 17:
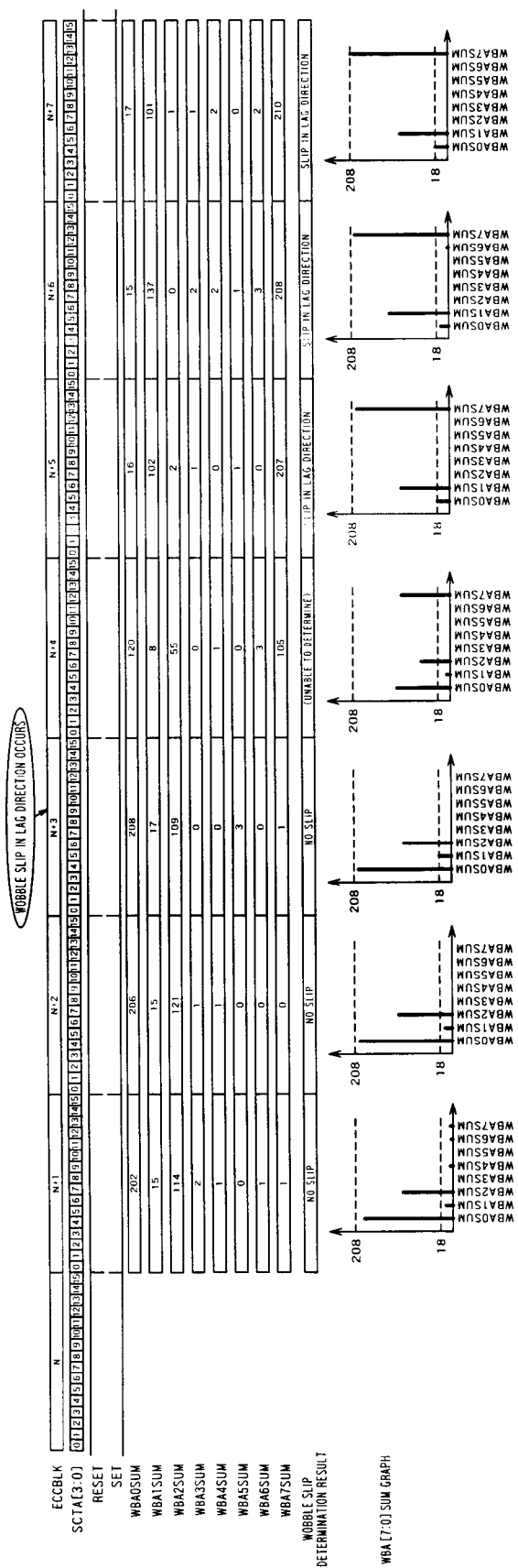
FIG. 17 is a timing chart showing temporal changes of the "WBA[7:0]SUM" values in a case where a wobble slip occurs in the lag direction.
Figure 18:
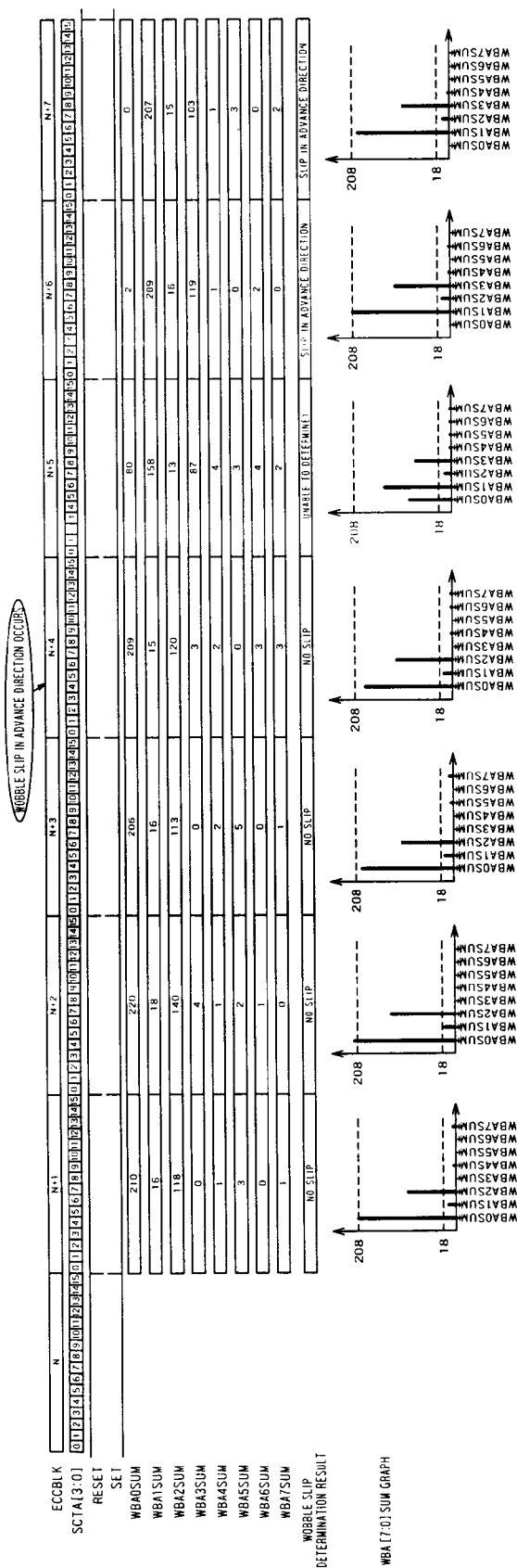
FIG. 18 is a timing chart showing temporal changes of the "WBA[7:0]SUM" values in a case where a wobble slip occurs in the advance direction.

FIG. 16 is a timing chart showing temporal changes of the "WBA[7:0]SUM" values in a case where no wobble slip occurs. FIG. 17 is a timing chart showing temporal changes of the "WBA[7:0]SUM" values in a case where a wobble slip occurs in the lag direction. FIG. 18 is a timing chart showing temporal changes of the "WBA[7:0]SUM" values in a case where a wobble slip occurs in the advance direction.

Each of the "WBA[7:0]SUM" values is determined for each ECC block. For example, the number of detected pre-pits for an N-th block is determined at the leading edge of an (N+1)-th block. Each of the "WBA[7:0]SUM" values is determined for each ECC block (sector address (SCTA[3:0]) ="0")).

FIG. 16 shows a case where no wobble PLL slip occurs, and the "WBA[7:0]SUM" values vary as shown in FIG. 12A.

FIG. 17 shows a case where a wobble PLL slip occurs in the lag direction due to lack of a wobble signal due to a scratch or the like. As shown in FIG. 17, a wobble slip occurs in the (N+3)-th block. If the wobble PLL slips in the lag direction, the positional relationship between the pre-pits and the locked wobble is shifted. As a result, the pre-pits, which would otherwise be detected at positions where the wobble counter value "WBA[2:0]"="0", "1" and "2", appear at positions where the "WBA[2:0]" value="7", "0" and "1" in the (N+4)-th and the following blocks (the pre-pit positions are determined in the (N+5)-th block).

FIG. 18 shows a case where a wobble PLL slip occurs in the advance direction due to lack of a wobble signal due to a scratch or the like. As shown in FIG. 18, a wobble PLL slip occurs in the (N+4)-th block. If the wobble PLL slips in the advance direction, the positional relationship between the pre-pits and the locked wobble is shifted, and the pre-pits, which would otherwise be detected at positions where the wobble counter value "WBA[2:0]"="0", "1" and "2", appear at positions where the "WBA[2:0]" value="1", "2" and "3" in the (N+5)-th and the following blocks (the pre-pit positions are determined in the (N+6)-th block).

When a wobble slip occurs, resynchronization of the pre-pit decoder 27 would otherwise be conducted, and the "WBA [2:0]" counters would operate to correct the one-wave shift. However, if the resynchronization is inhibited as described above, the pre-pit decoder 27 is in the free run state, and this state is maintained.

In FIGS. 16 to 18, the phrase "wobble slip determination result" means the result of wobble slip determination by the wobble slip determining circuit 104 based on the pre-pit distribution.

In the following, a reference for wobble slip determination based on the pre-pit distribution for each wobble will be specifically described.

The wobble slip determining circuit 104 receives the "WBA[7:0]SUM" values and determines that no slip occurs if the "WBA0SUM" value is the maximum value, that a slip occurs in the lag direction if the "WBA7SUM" value is the maximum value, and that a slip occurs in the advance direction if the "WBA1SUM" value is the maximum value.

The determination of the maximum value is performed under the following conditions, for example.

First, the maximum value and the second maximum value are compared, and the difference is equal to or more than 30 (as for this value, a recommendation value has to be determined from an experimental value or the like), for example.

Second, the maximum value is equal to or more than 160 and equal to or less than 232 (also as for this value, a recommendation value has to be determined from an experimental value or the like).

The first condition is intended to address a case where a wobble slip occurs in the middle of an ECC block, and it is difficult to determine whether the pre-pit distribution changes or not and to determine whether a wobble slip occurs or not from the pre-pit distribution for that block (the results of the (N+3)-th block in FIG. 17 and the (N+4)-th block in FIG. 18). Furthermore, the first condition is provided because, even in the steady state, the difference between the "WBA0SUM" value and the "WBA2SUM" value is small depending on the pre-pit data pattern.

The second condition is provided because, in the case where quite many pre-pits are erroneously detected, the relativity of the "WBA[7:0]SUM" values themselves are low. Basically, the pre-pit slice level is preferably set at a low level to some extent so that detection or noise is prevented (the number of erroneous detections decreases) (FIG. 14 of FIGS. 12 to 14).

In the case where the wobble slip determination is performed after the maximum of the "WBA[7:0]SUM" values is determined, for example, the maximum value may be determined from three, "WBA0SUM", "WBA1SUM" and "WBA7SUM" values of the "WBA[7:0]SUM" values. Alternatively, the maximum value may be determined from five, "WBA0SUM", "WBA1SUM", "WBA2SUM", "WBA6SUM" and "WBA7SUM" values of the "WBA[7:0]SUM" values. In this case, the circuit size can be reduced.

Furthermore, to improve the wobble slip detection precision, a pair of the maximum value and the second maximum value may be detected, rather than detecting only the maximum value. For example, under the DVD-R/RW standard, the "WBA0SUM" value is the maximum, and the "WBA2SUM" value is the second maximum. Based on this relationship, for example, it can be determined that one wobble slip occurs in the lag direction when the "WBA7SUM" value is the maximum value, and the "WBA1SUM" value is the second maximum value. And, it can be determined that one wobble slip occurs in the advance direction when the "WBA1SUM" value is the maximum value, and the "WBA3SUM" value is the second maximum value.

For example, according to the DVD-R/RW standard, the third maximum value is "16". Therefore, it is determined that one wobble slip occurs in the lag direction if the third maximum value is shifted from the "WBA1SUM" to the "WBA0SUM". On the other hand, it is determined that one wobble slip occurs in the advance direction if the third maximum value is shifted from the "WBA1SUM" to the "WBA2SUM".

For any of the determination methods described above, the wobble shift determination may be based on the number of detected pre-pits within a range larger or smaller than one ECC block, rather than based on the number of detected pre-pits within one ECC block. However, the illustrated one ECC block is a reasonable range because the detection accuracy increases as the number of population parameters increases, and the detection time becomes shorter as the number of population parameters decreases.

The wobble slip detection result obtained through the procedure described above (one wobble shift in the lag direction, 0, one wobble shift in the advance direction, unable to determine) is output to a control MPU.

In the case of a system for which a recording position shift equivalent to or more than one wobble is fatal, the system controller 31 may use the result as a criterion to stop recording.

On the other hand, for DVD recorders and DVD camcorders for consumer use, for example, data is recorded on a disk in real time, and it is not desirable to stop recording. In such a case, in order to prevent overwriting of recorded data or a gap in the recording area at the time of next recording, the recording position has to be gradually recovered before the recording is stopped.

In the following, there will be described an operation of correcting the recording position in response to the wobble slip detection result.

As shown in FIG. 1, the result of determination by the wobble slip determining circuit 104 may be output to the system controller 31 via the recording position controlling circuit 105.

The pre-pit distribution detecting circuit 103 and the wobble slip determining circuit 104 operate in the same way as described above.

The recording position controlling circuit 105 receives the recording position shift information for each channel bit output from the in-wobble recording position shift detecting circuit 102 and the position shift information for each wobble obtained by the wobble slip determining circuit 104 and outputs the recording position shift information to the system controller 31 and the recording clock controlling information to the recording clock generating circuit.

Basically, as for the recording position shift information, the system controller 31 can determine whether to stop recording or not based on the position shift amount.

In the following, an operation of correcting the recording position will be described.

Figure 19A:
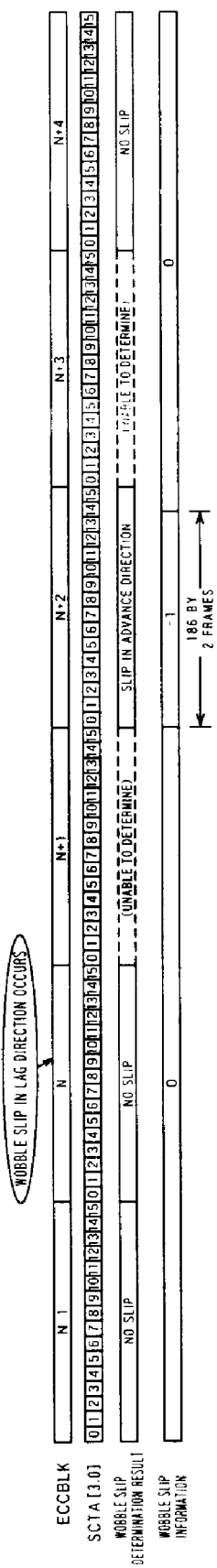
FIG. 19A is a timing chart showing operations of the recording position correction for each channel (within one wobble) described above and the recording position correction based on the wobble slip determination in a case where a wobble slip occurs in the lag direction.
Figure 19B:
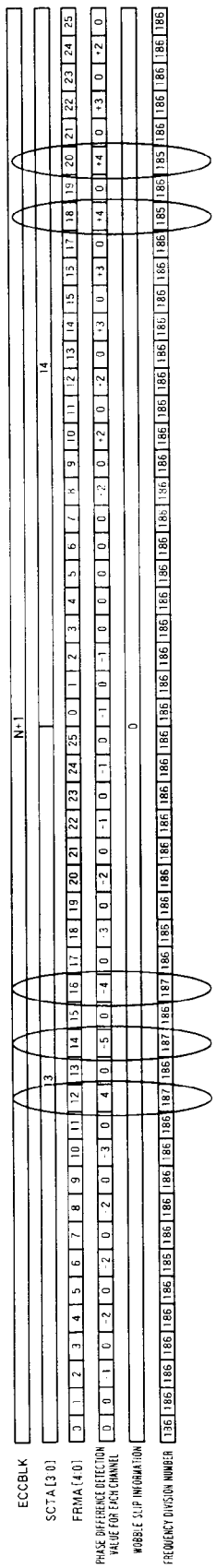
FIG. 19B is an enlarged diagram of parts of FIG. 19A.
Figure 19C:
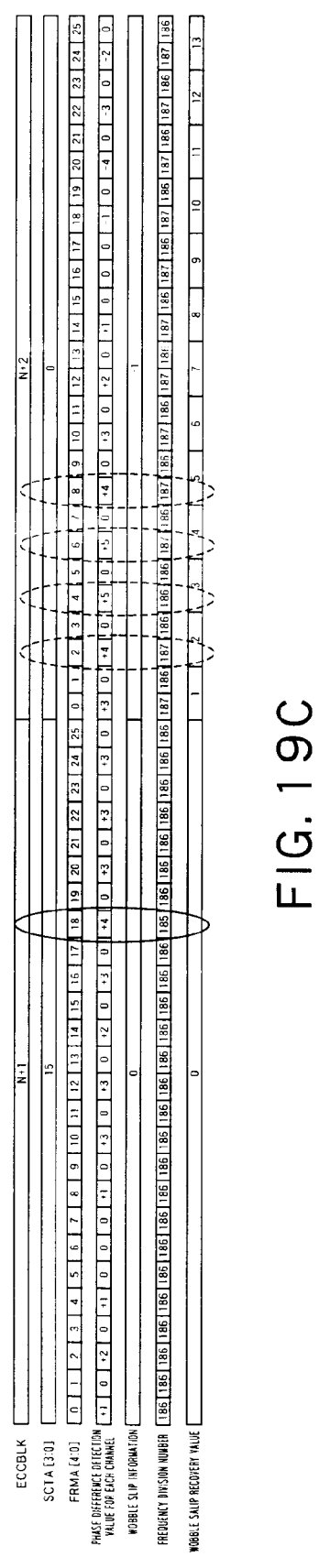
Figure 19D:
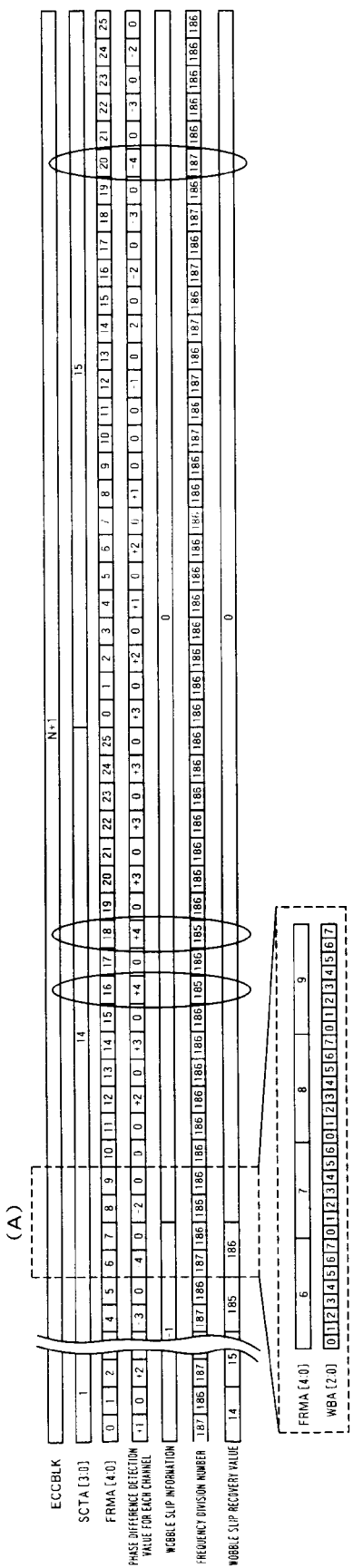
FIG. 19D is an enlarged diagram of parts of FIG. 19A.

FIG. 19A is a timing chart showing operations of the recording position correction for each channel (within one wobble) described above and the recording position correction based on the wobble slip determination in a case where a wobble slip occurs in the lag direction. FIGS. 19B to 19D are enlarged diagrams of parts of FIG. 19A.

The phase difference detection value for each channel is equivalent to the second phase difference detection value shown in FIG. 9. The frequency division number is equivalent to the frequency division number set in the programmable counter 30f in the recording clock generating circuit 30 shown in FIG. 8.

In the above description, the frequency division number is set for each wobble, and "±1" is added to the initial value "186" of the frequency division number only for one wobble after the phase difference information is obtained. Here, however, because of space limitation, "±1" is added for each frame.

For the phase difference value for each channel, a window is provided as described above. In this example, "±1" is added to the frequency division number if the phase difference value is equal to or smaller than "−4", and "−1" is added to the frequency division number if the phase difference value is equal to or larger than "+4".

As shown in FIGS. 19A to 19D, during recording, a wobble slip occurs in the lag direction in the N-th block.

The wobble slip determination for the N-th block (which is determined in the (N+1)-th block) is "unable to determine". And, the result for the (N+1)-th block (which is determined in the (N+2)-th block) is "slip in the lag direction".

In FIGS. 19B to 19D, parts where the phase difference value for each channel exceeds the window range are surrounded by ellipses. The parts surrounded by the ellipses drawn by the solid line show that the phase difference detection result for each channel that exceeds the window affects the frequency division number (default values is "186") in the recording clock generating circuit 30, and the recording position is adjusted.

The parts surrounded by the ellipses drawn by the dotted line show that the phase difference detection result for each channel that exceeds the window does not affect the frequency division number.

In a period in which the wobble slip information indicates "−1" in the (N+2)-th block, the wobble slip information, which indicates a larger shift, is given a priority, and the phase difference detection result for each channel is ignored. The phase difference detecting circuit 101 shown in FIG. 1 gives the priority. In the (N+2)-th block, the frequency division number is set at "187" over (186 by 2) wobbles. As a result, recovery from the shift is bought about by 186 channels. If the frequency division number is changed only for one wobble in two frames, recovery from the recording position shift due to the wobble slip is brought about in (186 by 2) frames. After that (following the 15th sector in the (N+2)-th block FRMA

[4:0]=8), the wobble slip information is reset to "0", and the phase difference detection result for each channel is adopted again.

As shown in FIG. 19D, the "WBA[2:0]" counter advances the count by one wave at the same point in time when FRMA [4:0] changes from 7 to 8. This is intended to be ready for subsequent wobble slips by making a correction for pre-pits to recover to predetermined positions in response to elimination of the wobble slip.

Since the "WBA" counter is nonlinear in this way, the wobble slip detection result in the (N+2)-th block is forced to be "unable to determine".

Figure 20A:
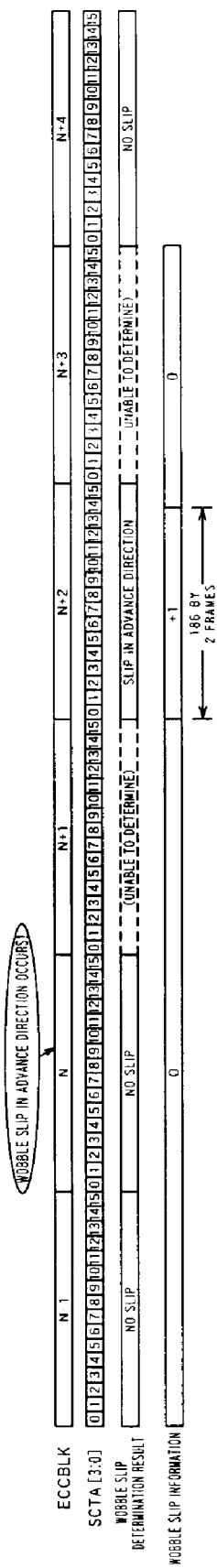
FIG. 20A is a timing chart showing operations of the recording position correction for each channel (within one wobble) described above and the recording position correction based on the wobble slip determination in a case where a wobble slip occurs in the advance direction.
Figure 20B:
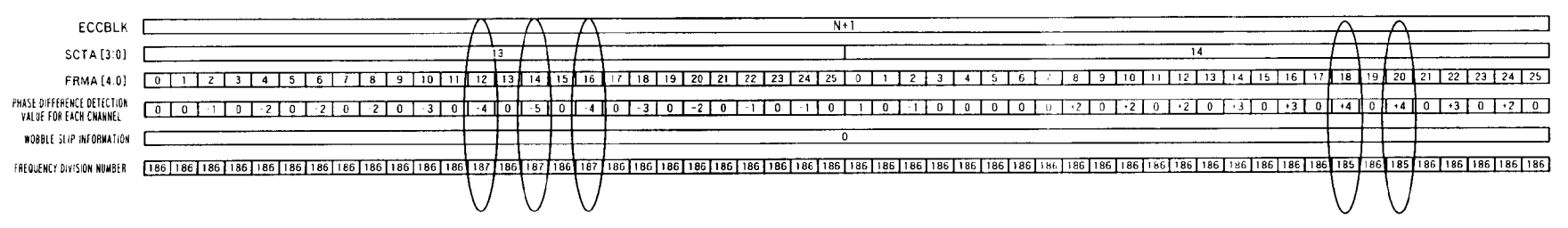
Figure 20C:
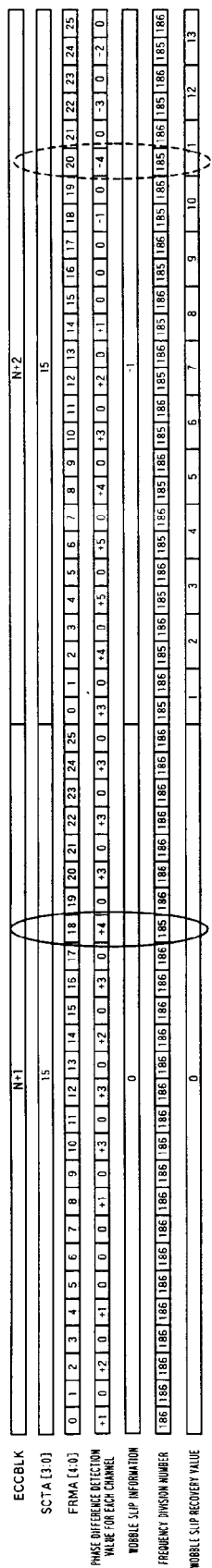
FIG. 20C is an enlarged diagram of parts of FIG. 20A.
Figure 20D:
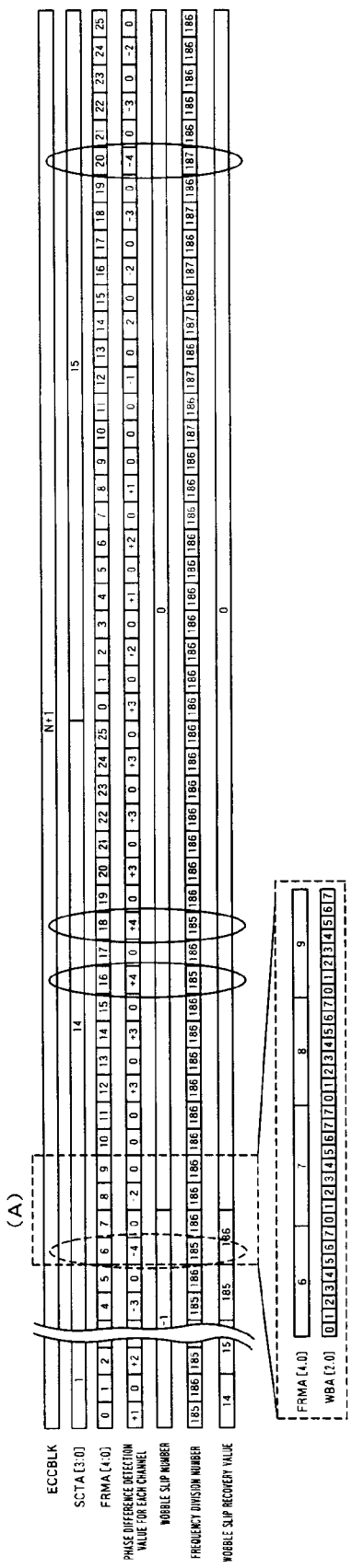
FIG. 20D is an enlarged diagram of parts of FIG. 20A.

On the other hand, FIG. 20A is a timing chart showing operations of the recording position correction for each channel (within one wobble) described above and the recording position correction based on the wobble slip determination in a case where a wobble slip occurs in the advance direction. FIGS. 20B to 20D are enlarged diagrams of parts of FIG. 20A.

The parts surrounded by the ellipses drawn by the solid line show that the phase difference detection result for each channel that exceeds the window affects the frequency division number (default values is "186") in the recording clock generating circuit 30, and the recording position is adjusted.

The parts surrounded by the ellipses drawn by the dotted line show that the phase difference detection result for each channel that exceeds the window does not affect the frequency division number. In this example, the phase difference detection result for the advance direction for each channel is ignored, and the wobble slip detection result for the advance direction for the (N+2)-th block is adopted.

In FIG. 20D, the "WBA[2:0]" counters make a correction by counting one extra wave at the point in time when FRMA [4:0] changes from 7 to 8.

The correction by the "WBA[2:0]" counters may not be performed, and the subsequent wobble slips may be addressed with reference to the one-wave-shifted state.

For example, referring to FIG. 19D, the "WBA[2:0]" count value is not changed in the (A) region, and the one-wave-lag state is used as a reference for determination of the subsequent wobble slips. It is determined that no slip occurs when the "WBA7SUM" is the maximum value. And it is determined that a wobble slip occurs in the lag direction when the maximum value is shifted to the "WBA6SUM". It is determined that a wobble slip occurs in the advance direction when the maximum value is shifted to the "WBA0SUM".

Similarly, referring to FIG. 20D, the one-wave-advance state is used as a reference for determination of a wobble slip. It is determined that no slip occurs when the "WBA1SUM" is the maximum value. And it is determined that a wobble slip occurs in the advance direction when the maximum value is shifted to the "WBA2SUM". It is determined that a wobble slip occurs in the lag direction when the maximum value is shifted to the "WBA0SUM".

As for the control of the recording clock for recovering the recording position, the gain may be changed as described above.

In this way, the system controller 31 may perform the wobble slip determination.

As described above, the optical disk recording device according to this embodiment stops recording or controls the recording clock to recover the recording position to the correct position without stopping recording if the optical disk recording device detects a recording position shift.

Thus, overwriting of recorded data or occurrence of a gap in the recording area can be prevented during incremental writing, and the reliability of the recorded data on the optical disk can be assured.

What is claimed is:

1. An optical disk recording device that detects a shift of the recording position with respect to an optical disk, comprising:
   a pre-pit distribution detecting circuit that detects the distribution of pre-pits for a plurality of wobbles based on binarized pre-pit signals obtained by binarizing pre-pit signals corresponding to pre-pits on said optical disk and a wobble counter value obtained by counting said binarized pre-pit signals in synchronization with a locked wobble, which is a wobble signal having a period corresponding to a wobble on said optical disk and fixed in phase;
   a wobble slip determining circuit that compares the distribution of said pre-pits detected by said pre-pit distribution detecting circuit and a reference pre-pit distribution corresponding to a desired recording position, thereby determining the shift amount of the recording position with respect to said desired recording position for each wobble; and
   an in-wobble recording position shift detecting circuit that holds, in synchronization with said binarized pre-pit signals, a counter value associated with the phase of said wobble obtained by dividing the frequency of a recording clock and counting frequency-divided recording clocks, and detects the shift amount of said recording position based on said held counter value.

2. The optical disk recording device according to claim 1, further comprising: a pre-pit decoder that has a synchronizing counter which makes a count according to the locked wobble.

3. The optical disk recording device according to claim 2, wherein the pre-pit decoder determines whether the binarized pre-pit is present or absent in each wobble, and decodes any pre-pit using the synchronizing counter.

4. The optical disk recording device according to claim 2, wherein the synchronizing counter has to be kept in a free run state during recording.

5. The optical disk recording device according to claim 1, wherein said pre-pit distribution detecting circuit has a decoding circuit, a counter that receives decode results from decoding circuit, a latch circuit that is set up with respect to the counter, and a timing controlling circuit.

6. The optical disk recording device according to claim 2, wherein said pre-pit distribution detecting circuit has a decoding circuit, a counter that receives decode results from decoding circuit, a latch circuit that is set up with respect to the counter, and a timing controlling circuit.

7. The optical disk recording device according to claim 6, wherein the decode circuit decodes a counter value made by the synchronizing counter and outputs the decode result,
   the counter is reset according to a reset signal outputted from the timing controlling circuit,
   the latch circuit latches output results of the counter with a set signal outputted from the timing controlling circuit and output latch results to the wobble slip determining circuit.

8. The optical disk recording device according to claim 1, further comprising:
   a recording clock generating circuit that outputs said recording clock based on said locked wobble,
   wherein said recording clock generating circuit corrects the phase of said recording clock based on said recording position shift amount to correct said recording position to said desired recording position.

9. The optical disk recording device according to claim 8, further comprising:
   a recording position controlling circuit that outputs a signal to control said recording clock generating circuit or a signal to stop recording onto said optical disk based on at least one of the result of determination by said wobble slip determining circuit and the result of detection by said in-wobble recording position shift detecting circuit.

10. The optical disk recording device according to claim 9, wherein said recording position controlling circuit outputs the signal to control said recording clock generating circuit to make said recording clock generating circuit correct the phase of said recording clock to correct said recording position to said desired recording position if said wobble slip determining circuit determines that no recording position shift occurs for each wobble, and said in-wobble recording position shift detecting circuit detects a recording position shift.

11. The optical disk recording device according to claim 1, wherein said optical disk is a DVD-R/RW.

12. The optical disk recording device according to claim 1, further comprising:
- a pick-up that emits laser light to an optical disk and reads the reflection light;
- a matrix amplifier that calculates and generates a pre-pit signal, a wobble signal and a servo error signal from a reproduction signal from the pick-up;
- a servo controlling circuit that controls operations of the pick-up based on the servo error signal;
- a disk motor that drives the optical disk;
- a laser driving circuit that drives a laser of the pick-up based on a recording signal; and
- a disk motor controlling circuit that controls the rotation of the disk motor.

\* \* \* \* \*